US009432982B2

(12) United States Patent
Lee et al.

(10) Patent No.: US 9,432,982 B2
(45) Date of Patent: Aug. 30, 2016

(54) METHOD AND APPARATUS FOR TRANSMITTING CONTROL INFORMATION IN WIRELESS COMMUNICATION SYSTEM

(75) Inventors: Hyunwoo Lee, Anyang-si (KR); Seunghee Han, Anyang-si (KR); Jinmin Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 339 days.

(21) Appl. No.: 14/005,705

(22) PCT Filed: Apr. 27, 2012

(86) PCT No.: PCT/KR2012/003300
§ 371 (c)(1),
(2), (4) Date: Sep. 17, 2013

(87) PCT Pub. No.: WO2012/148222
PCT Pub. Date: Nov. 1, 2012

(65) Prior Publication Data
US 2014/0003381 A1    Jan. 2, 2014

Related U.S. Application Data

(60) Provisional application No. 61/479,820, filed on Apr. 27, 2011.

(51) Int. Cl.
*H04W 72/04* (2009.01)
*H04L 1/00* (2006.01)
(Continued)

(52) U.S. Cl.
CPC .......... *H04W 72/042* (2013.01); *H04L 1/0026* (2013.01); *H04L 1/0027* (2013.01);
(Continued)

(58) Field of Classification Search
CPC ............. H04W 72/042; H04L 1/0026; H04L 1/0027; H04L 1/1671; H04L 1/1812; H04L 1/1822; H04L 1/1854; H04L 5/001; H04L 5/0055; H04L 1/06
See application file for complete search history.

(56) References Cited

U.S. PATENT DOCUMENTS

2010/0098012 A1    4/2010  Bala et al.
2010/0210256 A1*   8/2010  Shen ..................... H04L 1/1614
                                                       455/422.1
(Continued)

FOREIGN PATENT DOCUMENTS

CN    101640902 A    2/2010
CN    101682603 A    3/2010
(Continued)

OTHER PUBLICATIONS

Yu et al., "UMB TDD Frame Structure Proposal", 3GPP2-C30-20080218-024, Feb. 18, 2008, XP-062168119, pp. 1-14.
(Continued)

*Primary Examiner* — Ajay Cattungal
(74) *Attorney, Agent, or Firm* — Birch, Stewart, Kolasch & Birch, LLP

(57) ABSTRACT

A method and apparatus for transmitting control information in a wireless communication system which can support carrier aggregation (CA) are provided. In the method for transmitting control information from a terminal to at least one base station, the terminal receives at least one of a Physical Downlink Control Channel (PDCCH) and a Physical Downlink Shared Channel (PDSCH) from the at least one base station through at least one serving cell configured in the terminal and transmits control information associated with reception of the PDCCH or reception of a PDSCH indicated by the PDCCH to the at least one base station, wherein each of the at least one base station uses a different uplink and downlink configuration (UL-DL configuration) and a uplink-downlink (UL-DL) configuration used in the at least one serving cell can be changed based on a timing determined according to a preset condition.

17 Claims, 42 Drawing Sheets

(51) Int. Cl.
*H04L 1/16* (2006.01)
*H04L 1/18* (2006.01)
*H04L 5/00* (2006.01)
*H04L 1/06* (2006.01)

(52) U.S. Cl.
CPC .......... *H04L1/1671* (2013.01); *H04L 1/1812* (2013.01); *H04L 1/1822* (2013.01); *H04L 1/1854* (2013.01); *H04L 5/001* (2013.01); *H04L 5/0055* (2013.01); *H04L 1/06* (2013.01)

(56) References Cited

U.S. PATENT DOCUMENTS

| | | |
|---|---|---|
| 2010/0278109 A1 | 11/2010 | Papasakellariou et al. |
| 2010/0322173 A1 | 12/2010 | Marinier et al. |
| 2011/0249578 A1 | 10/2011 | Nayeb Nazar et al. |
| 2012/0207109 A1* | 8/2012 | Pajukoski ............. H04L 1/0029 370/329 |
| 2012/0320805 A1* | 12/2012 | Yang ..................... H04L 1/18 370/280 |
| 2013/0223301 A1* | 8/2013 | Lee ...................... H04L 5/0055 370/281 |
| 2013/0272261 A1* | 10/2013 | Seo ...................... H04J 11/0056 370/329 |
| 2013/0322343 A1* | 12/2013 | Seo ...................... H04W 24/02 370/328 |
| 2013/0322397 A1* | 12/2013 | Lee ..................... H04W 56/0045 370/329 |
| 2013/0336177 A1* | 12/2013 | Gao ................. H04W 72/0446 370/280 |
| 2015/0270998 A1 | 9/2015 | Kwak et al. |

FOREIGN PATENT DOCUMENTS

| | | |
|---|---|---|
| CN | 101729128 A | 6/2010 |
| WO | WO 2010/049587 A1 | 5/2010 |
| WO | WO 2012/113131 A1 | 8/2012 |

OTHER PUBLICATIONS

ZTE, "Support to Live-Change of Downlink-Uplink Allocation Ratio in LTE/TDD", 3GPP TSG RAN WG1 Meeting #52bis, R1-081415, Shenzhen, China, Mar. 31-Apr. 4, 2008, pp. 1-14.

* cited by examiner

FIG. 5
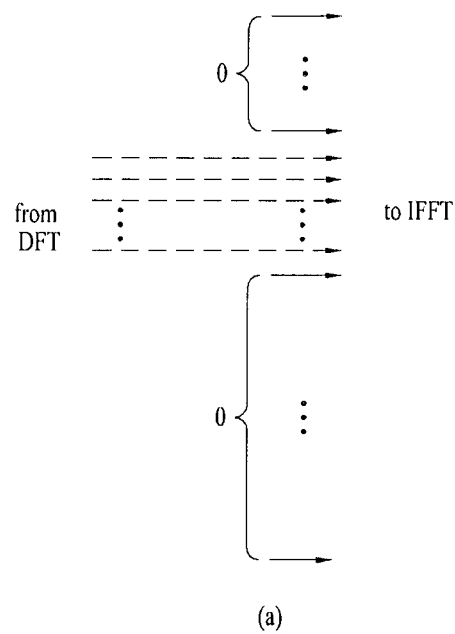
(a)
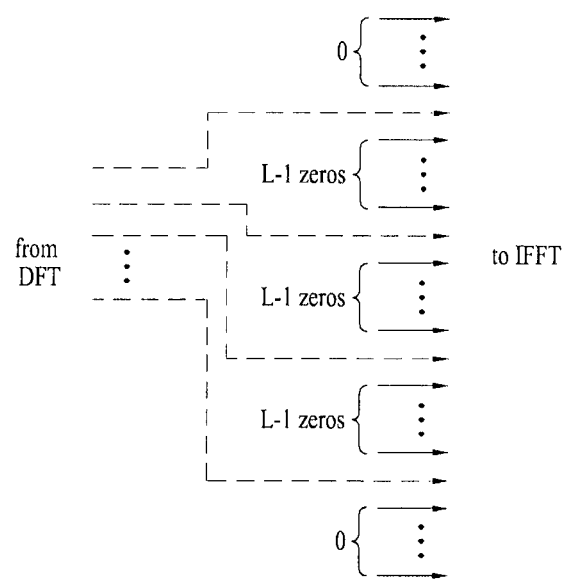
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\triangle_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | n' = 0 | | | n' = 0 | | |
| 2 | 1 | | 6 | 12 | | 6 | 12 |
| 3 | 2 | 1 | 7 | 13 | 1 | 7 | 13 |
| 4 | 3 | 2 | 8 | 14 | 2 | 8 | 14 |
| 5 | 4 | 3 | 9 | 15 | 3 | 9 | 15 |
| 6 | 5 | 4 | 10 | 16 | 4 | 10 | 16 |
| 7 | 6 | 5 | 11 | 17 | 5 | 11 | 17 |
| 8 | 7 | | | | | | |
| 9 | 8 | | | | | | |
| 10 | 9 | | | | | | |
| 11 | 10 | | | | | | |
| 0 | 11 | | | | | | |

$\Delta_{shift}^{PUCCH} \in \{\{1,2,3\} \text{ for normal cyclic prefix}, \{1,2,3\} \text{ for extended cyclic prefix}\}$ $\delta_{offset}^{PUCCH} \in \{0,1,...,\Delta_{shift}^{PUCCH} - 1\}$ Cell specific cyclic shift offset $n_{OC}$  Orthogonal sequence index for ACK/NACK
$\bar{n}_{OC}$  Orthogonal sequence index for RS
$n_{CS}$  Cyclic shift value of a CAZAC sequence
n'  ACK/NACK resource index used for the channelization in a RB FIG. 33
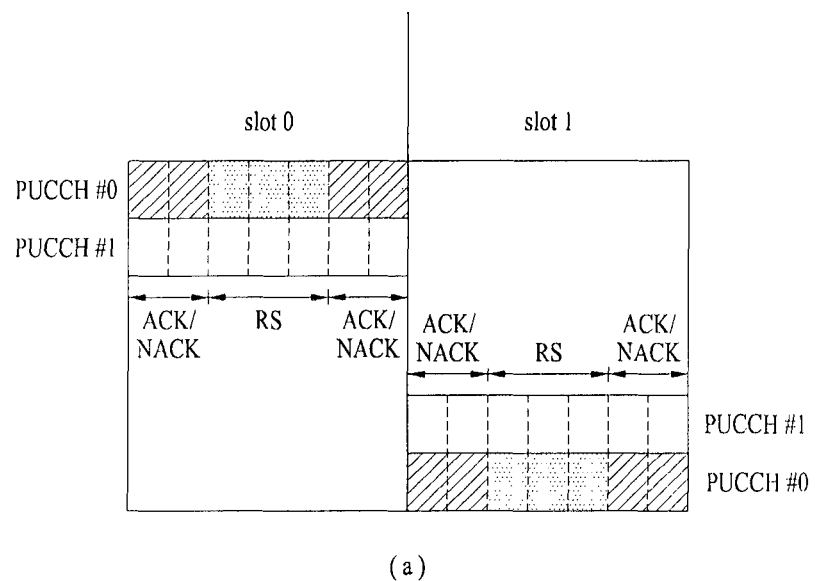
(a)
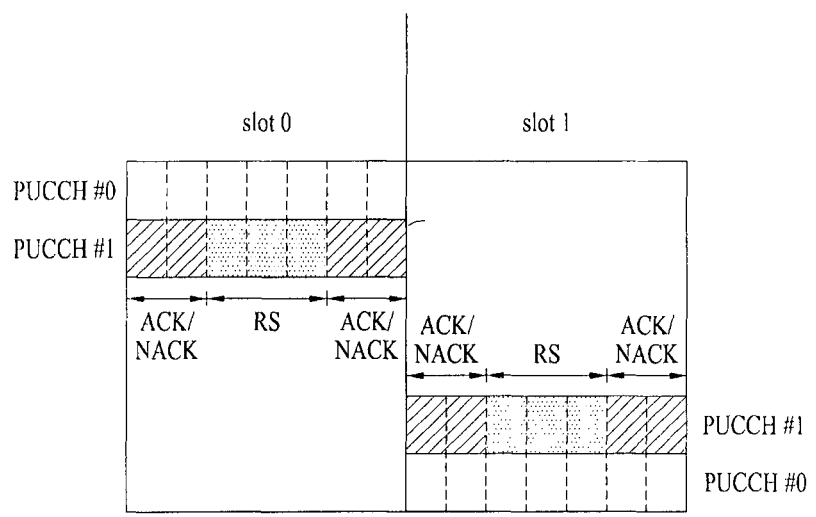
(b)

FIG. 34
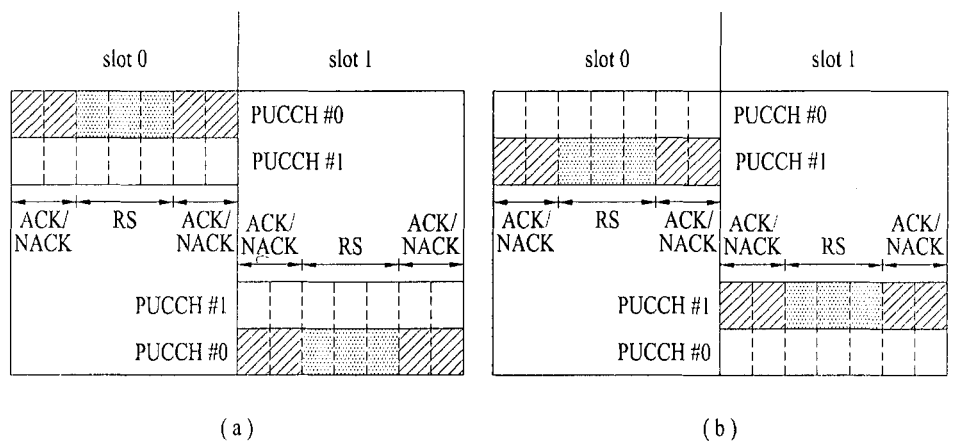
(a)           (b)
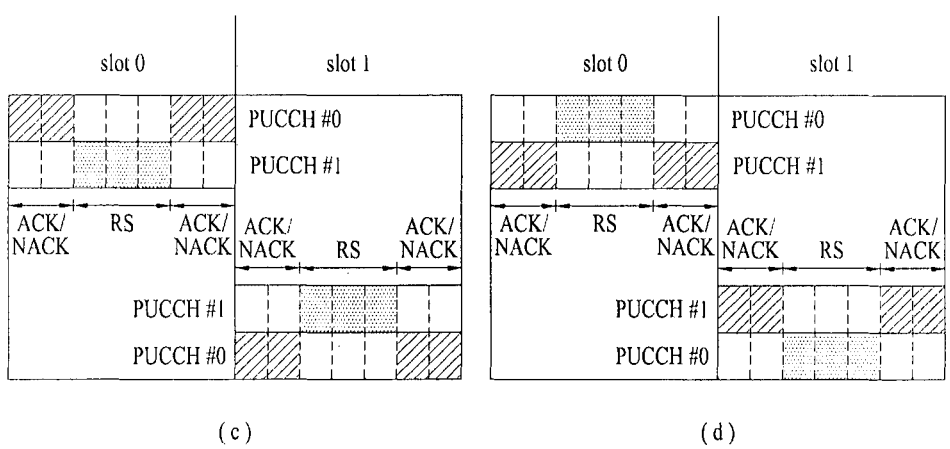
(c)           (d)

METHOD AND APPARATUS FOR TRANSMITTING CONTROL INFORMATION IN WIRELESS COMMUNICATION SYSTEM

CROSS-REFERENCE TO RELATED APPLICATIONS

This application is the National Phase of PCT/KR2012/003300 filed on Apr. 27, 2012, which claims priority under 35 U.S.C. 119(e) to U.S. Provisional Application No. 61/479,820 filed on Apr. 27, 2011, all of which are hereby expressly incorporated by reference into the present application.

TECHNICAL FIELD

The present invention relates to a wireless communication system, and more particularly to a method and apparatus for transmitting control information in a wireless communication system which can support carrier aggregation (CA).

BACKGROUND ART

Wireless communication systems have been widely deployed to provide various types of communication services such as voice or data services. Generally, a wireless communication system is a multiple access system that can communicate with multiple users by sharing available system resources (such as bandwidth, transmission (Tx) power, and the like). Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method and apparatus for effectively transmitting control information in a wireless communication system. Another object of the present invention is to provide a channel format and signal processing for effectively transmitting control information, and an apparatus for the same. A further object of the present invention is to provide a method and apparatus for effectively allocating resources for transmitting control information.

Objects of the present invention are not limited to those described above and other objects will be clearly understood by those skilled in the art from the following description.

Technical Solution

The object of the present invention can be achieved by providing a method for transmitting control information from a terminal to at least one base station in a wireless communication system, the method including receiving at least one of a Physical Downlink Control Channel (PDCCH) and a Physical Downlink Shared Channel (PDSCH) from the at least one base station through at least one serving cell configured in the terminal, and transmitting control information associated with reception of the PDCCH or reception of a PDSCH indicated by the PDCCH to the at least one base station, wherein each of the at least one base station may use a different uplink and downlink configuration (UL-DL configuration) and a uplink-downlink (UL-DL) configuration used in the at least one serving cell may be changed based on a timing determined according to a preset condition.

The UL-DL configuration used in the at least one serving cell may be changed based on a Hybrid Automatic Repeat reQuest (HARQ) process period and a multiple of the HARQ process period.

The HARQ process period may be a time period, at intervals of which time positions are repeated in each of the HARQ processes.

The timing may be repeated according to the HARQ process period or a multiple of the HARQ process period from a start or reset time of a System Frame Number (SFN).

The HARQ process period may be 8 or more subframes.

The HARQ process period may be determined differently according to the different UL-DL configuration of the at least one base station.

The HARQ process period may be 70 ms when the at least one base station has a 0th UL-DL configuration, 20 ms when the at least one base station has 1st to 5th UL-DL configurations, and 60 ms when the at least one base station has a 6th UL-DL configuration.

The UL-DL configuration used in the at least one serving cell may be changed according to a pattern period of an Almost Blank Subframe (ABS) or a multiple of the pattern period.

The timing may be repeated according to the pattern period of the ABS or a multiple of the pattern period from a start or reset time of a System Frame Number (SFN).

The pattern period of the ABS may be 70 ms when the at least one base station has a 0th UL-DL configuration, 20 ms when the at least one base station has 1st to 5th UL-DL configurations, and 60 ms when the at least one base station has a 6th UL-DL configuration.

The method may further include receiving first information from the base station, wherein the UL-DL configuration used in the at least one serving cell is changed according to the received first information.

The control information may be acknowledgment (ACK) or negative acknowledgment (NACK).

In another aspect of the present invention, provided herein is a terminal for transmitting control information to at least one base station in a wireless communication system, the terminal including a reception module for receiving at least one of a Physical Downlink Control Channel (PDCCH) and a Physical Downlink Shared Channel (PDSCH) from the at least one base station through at least one serving cell configured in the terminal, a transmission module for transmitting control information associated with reception of the PDCCH or reception of a PDSCH indicated by the PDCCH to the at least one base station, and a processor for performing a control operation for changing a UL-DL configuration used in the at least one serving cell based on a timing determined according to a preset condition, wherein each of the at least one base station may use a different uplink and downlink configuration (UL-DL configuration).

The processor may perform a control operation for changing the UL-DL configuration used in the at least one serving cell based on a Hybrid Automatic Repeat reQuest (HARQ) process period and a multiple of the HARQ process period.

The processor may perform a control operation for repeating the timing according to the HARQ process period or a multiple of the HARQ process period from a start or reset time of a System Frame Number (SFN).

The processor may perform a control operation for determining the HARQ process period differently according to the different UL-DL configuration of the at least one base station.

The HARQ process period may be 70 ms when the at least one base station has a 0th UL-DL configuration, 20 ms when the at least one base station has 1st to 5th UL-DL configurations, and 60 ms when the at least one base station has a 6th UL-DL configuration.

The processor may perform a control operation for changing the UL-DL configuration used in the at least one serving cell according to a pattern period of an Almost Blank Subframe (ABS) or a multiple of the pattern period.

The processor may perform a control operation for repeating the timing according to the pattern period of the ABS or a multiple of the pattern period from a start or reset time of a System Frame Number (SFN).

The pattern period of the ABS may be 70 ms when the at least one base station has a 0th UL-DL configuration, 20 ms when the at least one base station has 1st to 5th UL-DL configurations, and 60 ms when the at least one base station has a 6th UL-DL configuration.

Advantageous Effects

According to the present invention, it is possible to efficiently transmit control information in a wireless communication system. It is also possible to provide a channel format and a signal processing method for efficiently transmitting control information. It is also possible to efficiently allocate resources for control information transmission.

Advantages of the present invention are not limited to those described above and other advantages will be clearly understood by those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 illustrates examples in which an input symbol is mapped to a subcarrier in a frequency domain while satisfying single carrier characteristics;

FIG. 17 illustrates ACK/NACK channelization for the PUCCH formats 1a and 1b;

FIG. 33 illustrates an ACK/NACK information transmission structure based on channel selection to which the present invention is applied;

FIG. 34 illustrates an ACK/NACK information transmission structure using enhanced channel selection to which the present invention is applied;

BEST MODE

Figure 1:
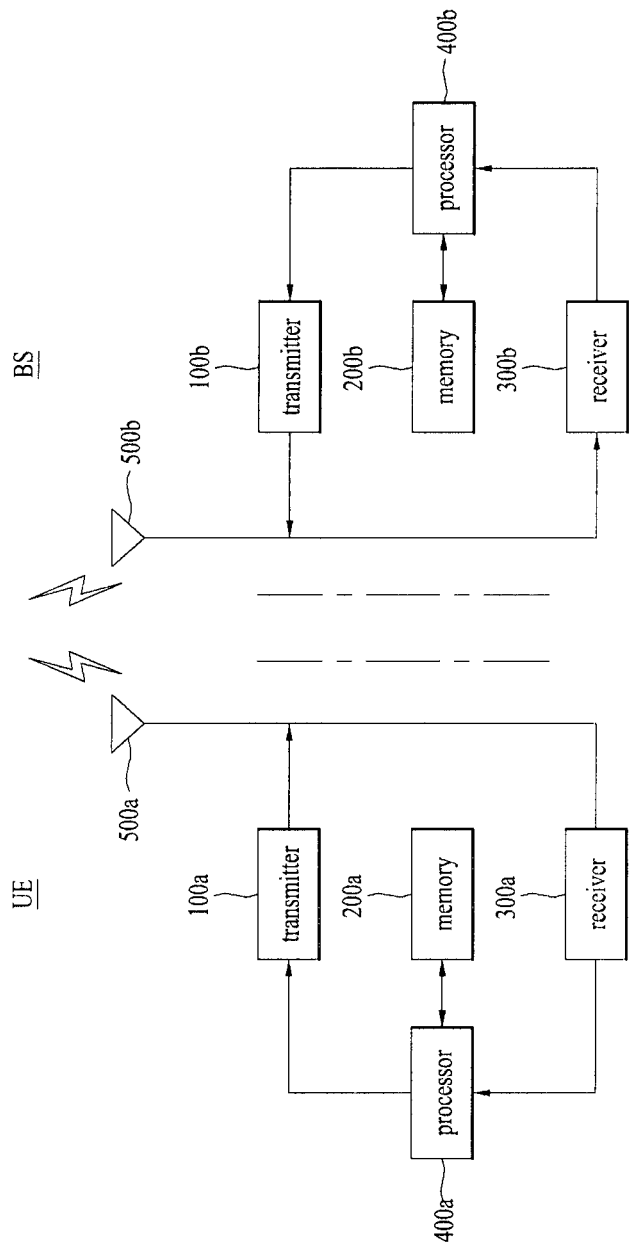
FIG. 1 illustrates configurations of a UE and a BS to which the present invention is applied.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Techniques, apparatuses and systems described in the following can be used in various wireless access systems. Examples of the various wireless access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system. CDMA may be implemented with a radio technology such as Universal Terrestrial Radio Access (UTRA) or CDMA2000. TDMA may be implemented with a radio technology such as Global System for Mobile communications (GSM), General Packet RadioService (GPRS), or Enhanced Data rates for GSM Evolution (EDGE). OFDMA may be implemented with a radio technology such as Institute of Electrical and Electronics Engineers (IEEE) 802.11 (Wi-Fi), IEEE 802.16 (WiMAX), IEEE 802.20, or Evolved-UTRA (E-UTRA). UTRAN is a part of Universal Mobile Telecommunication System (UMTS) and 3rd Generation Partnership Project (3GPP) Long Term Evolution (LTE) is a part of Evolved-UMTS (E-UMTS) that uses E-UTRAN. 3GPP LTE employs OFDMA for downlink and employs SC-FDMA for uplink. LTE-Advanced (LTE-A) is an evolved version of 3GPP LTE. For ease of explanation, the present invention will hereinafter be described on the assumption that the present invention is applied to 3GPP LTE/LTE-A. However, technical features of the present invention are not limited to the 3GPP LTE/LTE-A system. For example, although the following description will be given based on a wireless communication system corresponding to the 3GPP LTE/LTE-A system, the following description can be applied to other wireless communication systems, excluding unique features of the 3GPP LTE/LTE-A system.

In some instances, known structures and devices are omitted or shown in block diagram form, focusing on important features of the structures and devices, so as not to obscure the concept of the present invention. The same reference numbers will be used throughout this specification to refer to the same or like parts.

In the present invention, the term "terminal" refers to any device that may be stationary or mobile and may communicate with a BS to transmit and receive data and/control information to and from the BS. The terminal may also be referred to as a user equipment (UE), a mobile station (MS), a mobile terminal (MT), a user terminal (UT), a subscriber station (SS), a wireless device, a personal digital assistant (PDA), a wireless modem, or a handheld device.

The base station (BS) is a fixed station that communicates with a terminal or another BS to exchange various data and control information with the terminal or the other BS. The term "base station (BS)" may be replaced with another term such as evolved-Node B (eNB), base transceiver system (BTS), or access point (AP).

In the present invention, when it is said that a specific signal is allocated to a frame, subframe, slot, carrier, or subcarrier, this means that the specific signal is transmitted through the carrier or subcarrier during a period or timing of the frame, subframe, or slot.

In the present invention, the term "rank" or "transmission rank" refers to the number of layers that are multiplexed or allocated to one OFDM symbol or one Resource Element (RE).

In the present invention, the terms "Physical Downlink Control Channel (PDSCH)", "Physical Control Format Indicator Channel (PCFICH)", "Physical Hybrid automatic retransmit request Indicator Channel (PHICH)", and "Physical Downlink Shared Channel (PDSCH)" refer to a set of REs carrying Downlink Control Information (DCI), a set of REs carrying a Control Format Indicator (CFI), a set of REs carrying an ACK/NACK (ACKnowlegement/Negative ACK), and a set of REs carrying DL data, respectively.

In addition, the terms "Physical Uplink Control Channel (PUCCH)", "Physical Uplink Shared Channel (PUSCH)", and "Physical Random Access Channel (PRACH)" refer to a set of REs carrying Uplink Control Information (UCI), a set of REs carrying UL data, and a set of REs carrying a random access signal, respectively.

In the present invention, an RE that is assigned to or belongs to a PDCCH/PCFICH/PHICH/PDSCH/PUCCH/PUSCH/PRACH may be referred to as a PDCCH/PCFICH/PHICH/PDSCH/PUCCH/PUSCH/PRACH RE or a PDCCH/PCFICH/PHICH/PDSCH/PUCCH/PUSCH/PRACH resource.

Therefore, in the present invention, transmission of a PUCCH/PUSCH/PRACH by a terminal may be conceptually identical to transmission of UL control information/UL data/random access signal through a PUSCH/PUCCH/PRACH. In addition, transmission of a PDCCH/PCFICH/PHICH/PDSCH by a BS may be conceptually identical to transmission of DL control information/data through a PDCCH/PCFICH/PHICH/PDSCH.

On the other hand, in the present invention, mapping of ACK/NACK information to a specific constellation point may be conceptually identical to mapping of ACK/NACK information to a specific complex modulation symbol. In addition, mapping of ACK/NACK information mapped to a specific complex modulation symbol may be conceptually identical to modulation of ACK/NACK information into a specific complex modulation symbol.

FIG. 1 illustrates configurations of a UE and a BS to which the present invention is applied. The UE operates as a transmitting device in uplink and operates as a receiving device in downlink. On the other hand, the BS operates as a receiving device in uplink and operates as a transmitting device in downlink.

As shown in FIG. 1, the UE and the BS include antennas 500a and 500b for receiving information, data, signals, messages, or the like, transmitters 100a and 100b for transmitting messages by controlling the antennas 500a and 500b, receivers 300a and 300b for receiving information, data, signals, messages, or the like by controlling the antennas 500a and 500b, and memories 200a and 200b for storing various information in the wireless communication system. The UE and the BS further include processors 400a and 400b, respectively, which are operatively connected to the components of the UE and the BS, such as the transmitters 100a and 100b, the receivers 300a and 300b, and the memories 200a and 200b to control the components.

The transmitter 100a, the memory 200a, the receiver 300a, and the processor 400a in the UE may be configured as independent components on separate chips or two or more of these components may be implemented through a single chip. Similarly, the transmitter 100b, the memory 200b, the receiver 300b, and the processor 400b in the BS may be configured as independent components on separate chips or two or more of these components may be implemented through a single chip. The transmitter and the receiver may also be configured as a single transceiver in the UE or the BS.

The antennas 500a and 500b transmit signals generated from the transmitters 100a and 100b to the outside or transfer radio signals received from the outside to the receivers 300a and 300b. The antennas 500a and 500b may also be referred as antenna ports. Each antenna port may correspond to one physical antenna or may be constructed of a combination of physical antennas. If the transmitters 100a and 100b and/or the receivers 300a and 300b support a Multiple Input Multiple Output (MIMO) function which transmits and/or receives data or the like using multiple antennas, each antenna port may be connected to two or more antennas.

The processor 400a and/or 400b performs overall operation of the components or modules of the UE and/or the BS. Especially, the processors 400a and 400b may perform various control functions for performing the present invention, a Medium Access Control (MAC) frame variable control function based on service characteristics and radio environments, a power saving mode function for controlling idle-mode operations, a handover function, an authentication and encryption function, and the like. The processors 400a and 400b may also be referred to as controllers, microcontrollers, microprocessors, microcomputers, etc. The processors 400a and 400b may be implemented by hardware, firmware, software, or any combination thereof.

In the case in which the present invention is implemented by hardware, application specific integrated circuits (ASICs), digital signal processors (DSPs), digital signal processing devices (DSPDs), programmable logic devices (PLDs), field programmable gate arrays (FPGAs), or the like may be included in the processors 400a and 400b.

In the case in which the present invention is implemented by firmware or software, the firmware or software may be configured such that the firmware or software includes modules, processes, functions, or the like for performing the features or operations. The firmware or software configured so as to perform the present invention may be included in the processors 400a and 400b or may be stored in the memories 200a and 200b so as to be executed by the processors 400a and 400b.

The transmitters 100a and 100b perform predetermined coding and modulation for signals and/or data, which are scheduled to be transmitted to the outside by the processors 400a and 400b or by schedulers connected to the processors 400a and 400b, and then transfer the resulting signals and/or data to the antennas 500a and 500b. The transmitters 100a and 100b and the receivers 300a and 300b of the UE and the BS may be configured in different manners depending on the procedures of processing transmitted signals and received signals.

The memories 200a and 200b may store programs required for processing and control of the processors 400a and 400b and may temporarily store input and output information. Each of the memories 200a and 200b may be used as a buffer. Each of the memories 200a and 200b may be implemented using a flash memory, a hard disk, a multimedia card micro, a card (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), a magnetic memory, a magnetic disc, or an optical disc.

Figure 2:
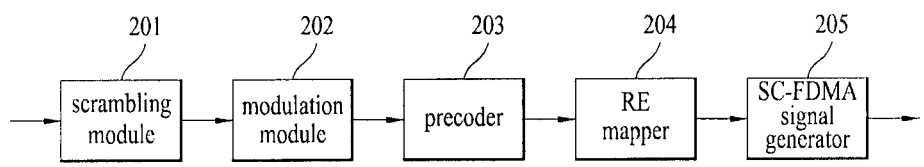
FIG. 2 illustrates a signal processing procedure that a UE performs for transmitting an uplink signal.

FIG. 2 illustrates a signal processing procedure that a UE performs for transmitting an uplink signal. As shown in FIG. 2, the transmitter 100a of the UE may include a scrambler 201, a modulation mapper 202, a precoder 203, a resource element (RE) mapper 204, and an SC-FDMA signal generator 205.

The scrambler 201 may scramble a transmission signal using a scramble signal in order to transmit the uplink signal. The scrambled signal is input to the modulation mapper 202 and the modulation mapper 202 then modulates the scrambled signal into complex symbols using a modulation scheme, such as Binary Phase Shift Keying (BPSK), Quadrature Phase Shift Keying (QPSK), or 16 Quadrature Amplitude Modulation (16QAM)/64 Quadrature Amplitude Modulation (64QAM), according to the type of the transmission signal and/or a channel status. A transform precoder 203 processes and inputs the modulated complex symbols to a resource element mapper 204. The resource element mapper 204 may map the processed complex symbols to time-frequency resource elements. The mapped signal may be transmitted to the BS through an antenna port via a Single Carrier-Frequency Division Multiple Access (SC-FDMA) signal generator 205.

Figure 3:
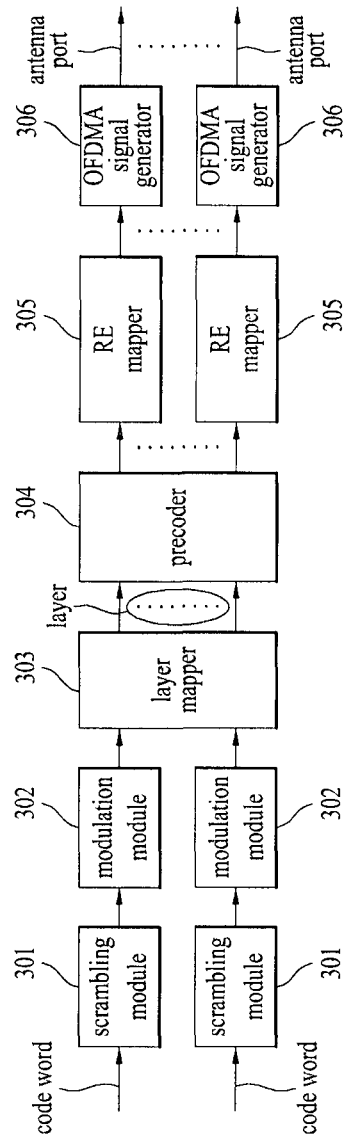
FIG. 3 illustrates a signal processing procedure that a BS performs for transmitting a downlink signal.

FIG. 3 illustrates a signal processing procedure that the BS performs for transmitting a downlink signal. As shown in FIG. 3, the transmitter 100b of the BS may include a scrambler 301, a modulation mapper 302, a layer mapper 303, a precoder 304, a resource element (RE) mapper 305, and an OFDMA signal generator 306.

In order to transmit a signal or at least one codeword in downlink, the signal or codewords may be modulated into complex symbols through the scrambler 301 and the modulation mapper 302 in the same manner as in FIG. 2. Thereafter, the modulated complex symbols may be mapped to a plurality of layers by the layer mapper 303 and each layer may then be allocated to a corresponding transmission antenna after being multiplied by a predetermined precoding matrix by the precoder 304. The processed transmission signal of each antenna is mapped to a time-frequency resource element (RE) by the RE mapper 305 and may then be transmitted through a corresponding antenna via the OFDMA signal generator 306.

When a UE transmits an uplink signal in a wireless communication system, there may be a Peak to Average Power Ratio (PAPR) problem compared to when a BS transmits a downlink signal. Thus, uplink signal transmission is performed using the SC-FDMA scheme while downlink signal transmission is performed using the OFDMA scheme as described above with reference to FIGS. 2 and 3.

Figure 4:
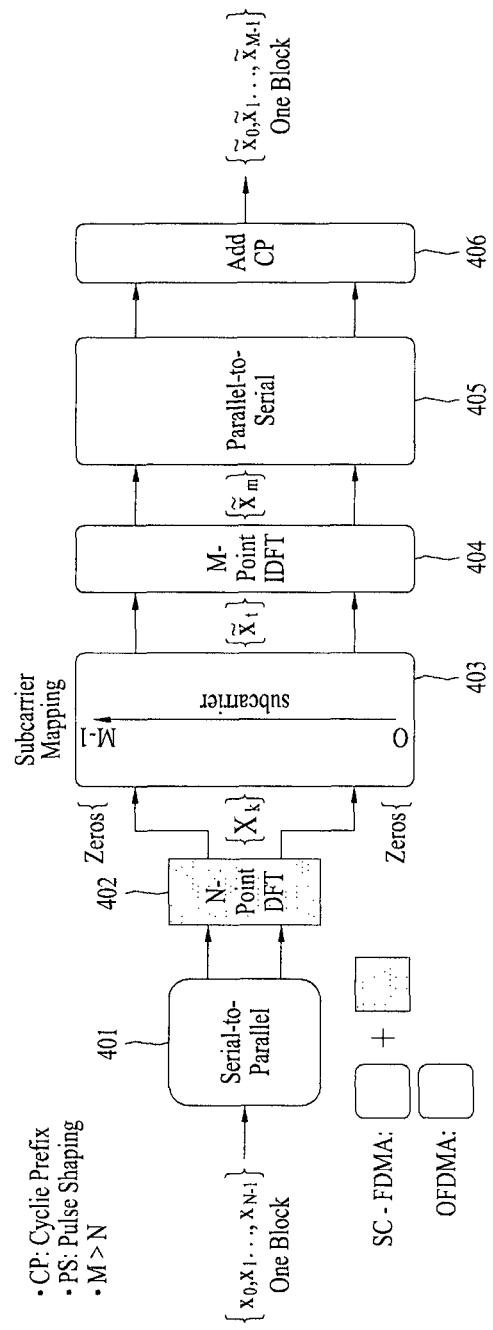
FIG. 4 illustrates an SC-FDMA scheme and an OFDMA scheme to which the present invention is applied.

FIG. 4 illustrates an SC-FDMA scheme and an OFDMA scheme to which the present invention is applied. The 3GPP system employs the OFDMA scheme in downlink and the SC-FDMA scheme in uplink.

As shown in FIG. 4, a UE for uplink signal transmission and a BS for downlink signal transmission are similar in that both include a Serial-to-Parallel converter 401, a subcarrier mapper 403, an M-point IDFT module 404 and a Cyclic Prefix (CP) addition module 406. However, a UE for transmitting a signal using the SC-FDMA scheme further includes an N-point DFT module 402. The N-point DFT module 402 compensates for a certain part of the influence of IDFT processing of the M-point IDFT module 1504 to allow a transmission signal to have single carrier properties.

SC-FDMA needs to satisfy single carrier characteristics. FIG. 5 shows examples in which an input symbol is mapped to a subcarrier in a frequency domain while satisfying single carrier characteristics. If a DFTed symbol is allocated to a subcarrier according to one of the mapping methods of FIGS. 5(*a*) and 5(*b*), it is possible to obtain a transmission signal satisfying single carrier characteristics. FIG. 5(*a*) illustrates a localized mapping method and FIG. 5(*b*) illustrates a distributed mapping method.

Figure 6:
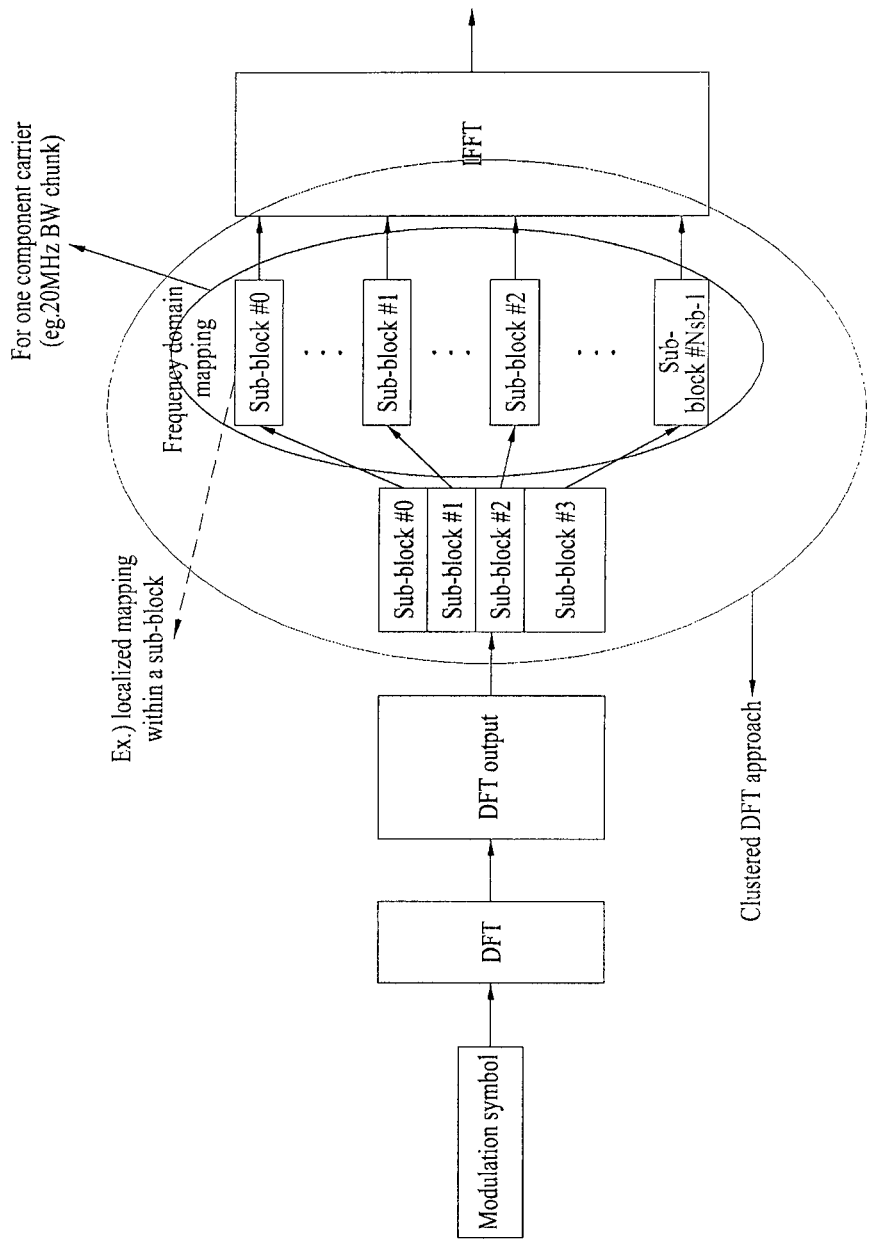
FIG. 6 illustrates a signal processing procedure in which DFT process output samples are mapped to a single carrier in the clustered SC-FDMA method.
Figure 7:
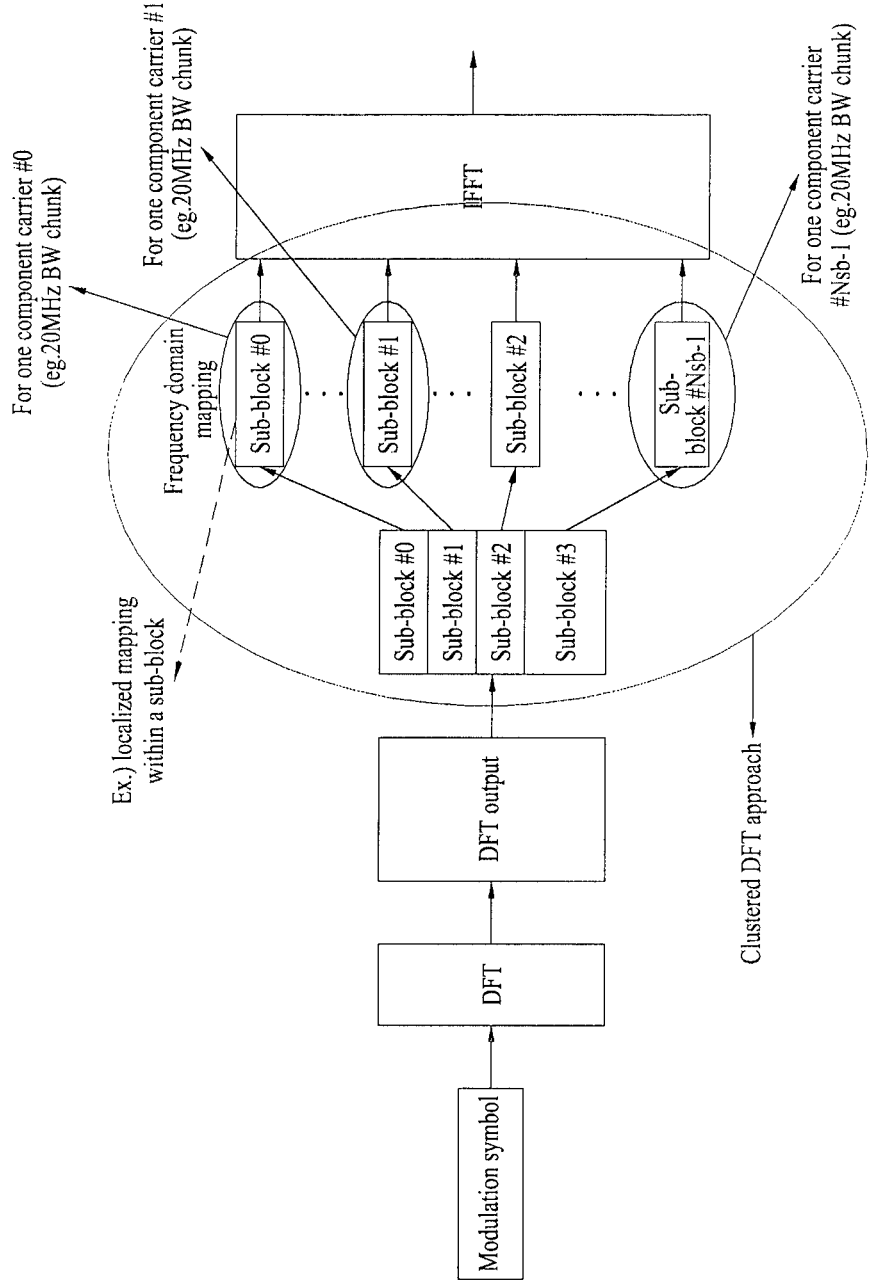
FIGS. 7 and 8 illustrate a signal processing procedure in which DFT process output samples are mapped to multiple carriers in a clustered SC-FDMA method.
Figure 8:
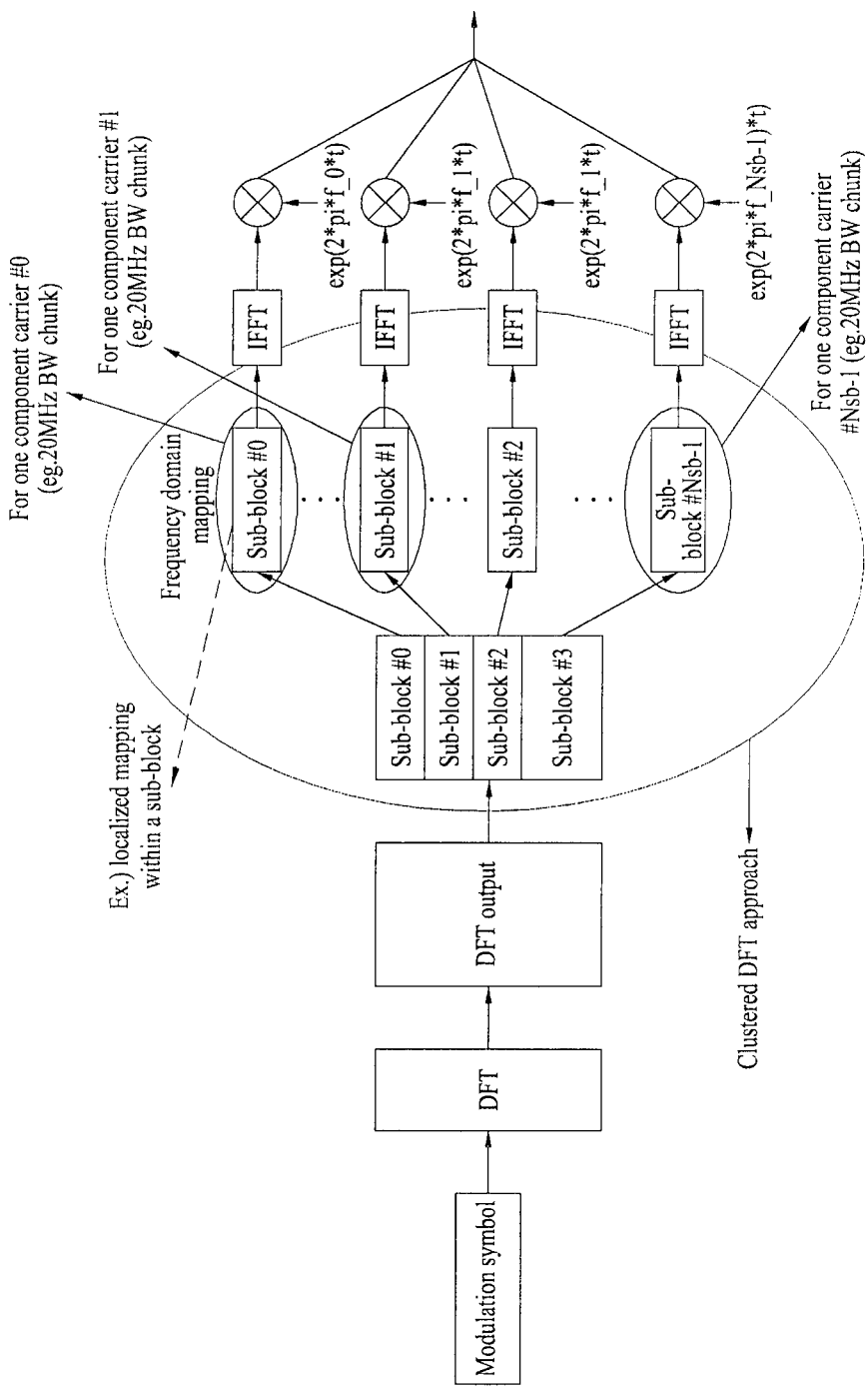

On the other hand, the transmitter 100*a* or 100*b* may employ the clustered DFT-s-OFDM scheme. The clustered DFT-s-OFDM scheme is a modification of the conventional SC-FDMA scheme in which a signal output from the precoder is divided into some sub-blocks and the divided sub-blocks are then discontinuously mapped to subcarriers. FIGS. 6 to 8 show examples in which an input symbol is mapped to a single carrier through clustered DFT-s-OFDM.

FIG. 6 shows a signal processing procedure in which DFT process output samples are mapped to a single carrier in the clustered SC-FDMA method. FIGS. 7 and 8 show a signal processing procedure in which DFT process output samples are mapped to multiple carriers in the clustered SC-FDMA method. Intra-carrier cluster SC-FDMA is applied to the example of FIG. 6 and inter-carrier clustered SC-FDMA is applied to the examples of FIGS. 7 and 8. Specifically, FIG. 7 shows an example in which a signal is generated through a single IFFT block when subcarrier spacings are defined between adjacent component carriers in the case in which component carriers are contiguously allocated to the frequency domain. FIG. 8 shows an example in which a signal is generated through a plurality of IFFT blocks when component carriers have been non-contiguously allocated to the frequency domain.

Figure 9:
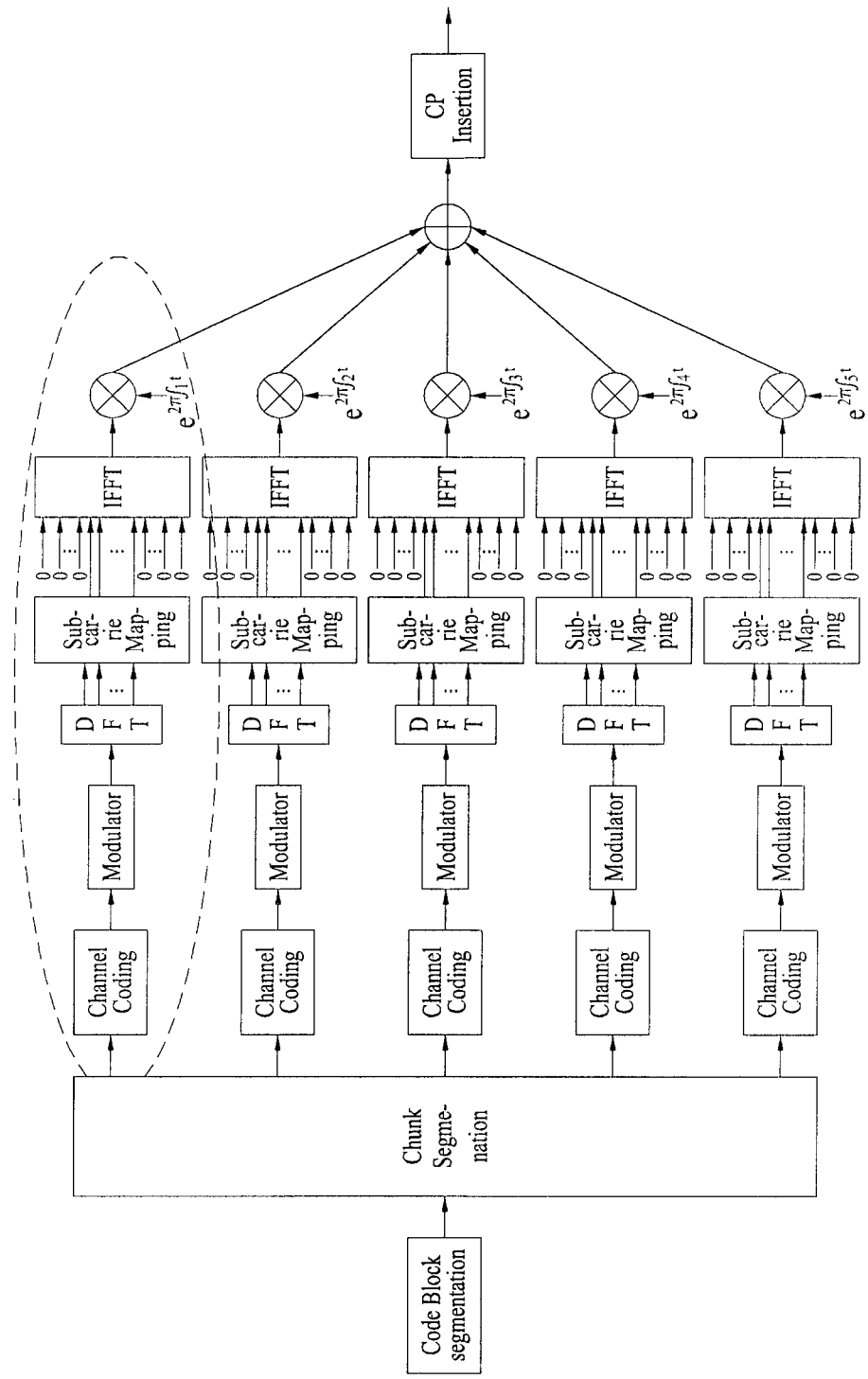
FIG. 9 illustrates a segmented SC-FDMA signal processing procedure.

FIG. 9 shows a segmented SC-FDMA signal processing procedure.

Segmented SC-FDMA simply extends the DFT spread and IFFT frequency subcarrier mapping structure of conventional SC-FDMA since DFTs and IFFTs are in a one-to-one relationship as the same number of IFFTs as that of DFTs is applied. Segmented SC-FDMA is also referred to as N×SC-FDMA or N×DFT-s-OFDMA. These schemes are collectively referred to as a segmented SC-FDMA. As shown in FIG. 9, in order to alleviate the requirements of single carrier characteristics, the segment SC-FDMA scheme groups all time-domain modulation symbols into N groups (N: an integer greater than 1) such that a DFT process is performed in units of a group.

Figure 10:
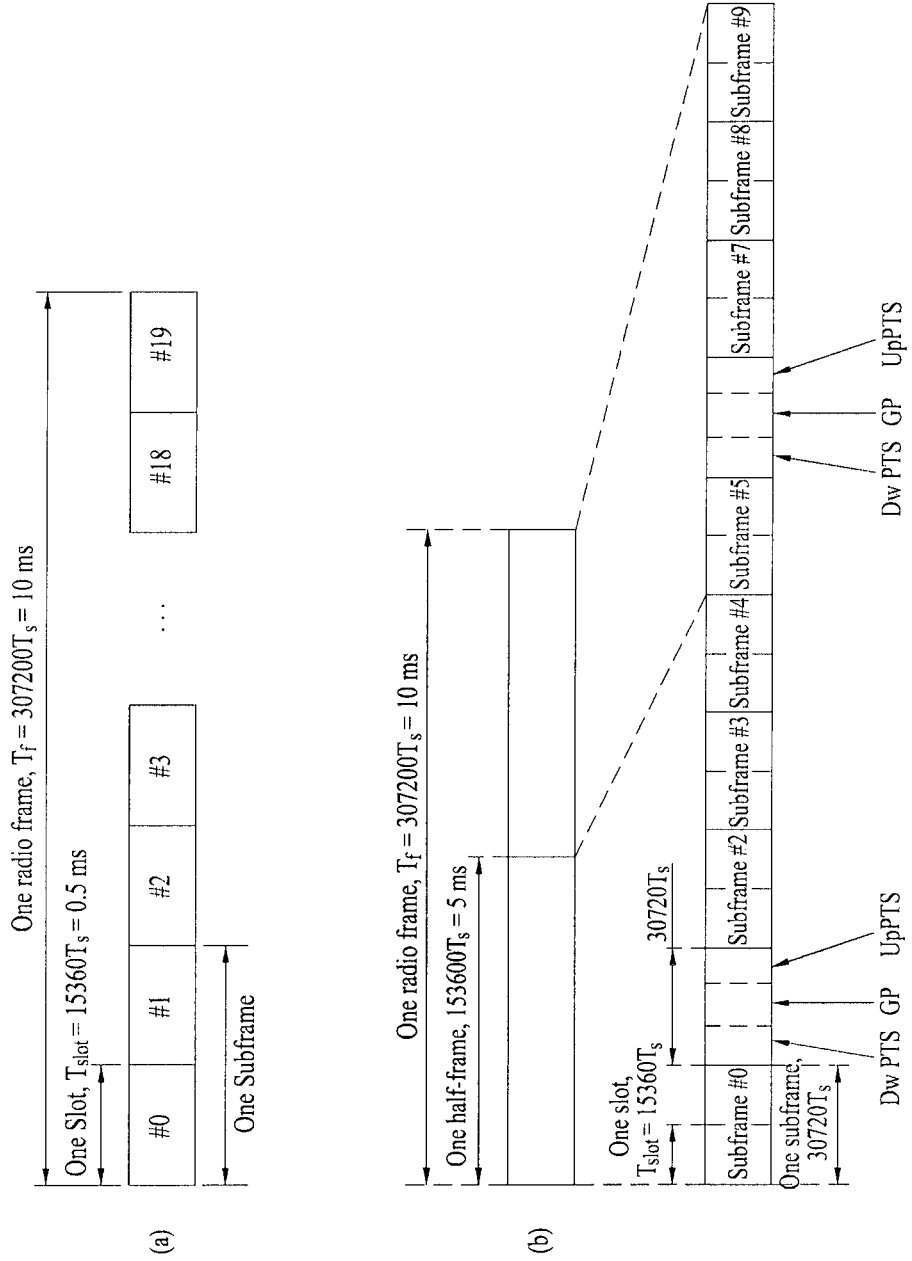
FIG. 10 illustrates exemplary structures of a radio frame used in a wireless communication system.

FIG. 10 illustrates exemplary structures of a radio frame used in a wireless communication system. Particularly, FIG. 10(*a*) illustrates a radio frame according to Frame Structure type 1 (FS-1) of a 3GPP LTE/LTE-A system and FIG. 10(*b*) illustrates a radio frame according to Frame Structure type 2 (FS-2) of the 3GPP LTE/LTE-A system. The frame structure of FIG. 10(*a*) may be applied to a Frequency Division Duplexing (FDD) mode and a half-FDD (H-FDD) mode. The frame structure of FIG. 10(*b*) may be applied to a Time Division Duplexing (TDD) mode.

As shown in FIG. 10, a radio frame used in 3GPP LTE/LTE-A is 10 ms (307,200 $T_s$) long and is divided into 10 subframes of the same size. Subframe numbers may be assigned respectively to 10 subframes within a radio frame. $T_s$ represents a sampling time and is given as $T_s=1/(2048\times15$ kHz). Each subframe is 1 ms long and is divided into two slots. 20 slots in a radio frame may be sequentially numbered 0 to 19. Each slot is 0.5 ms long. A time interval required to transmit one subframe is defined as a Transmission Time Interval (TTI). Time resources may be discriminated by a radio frame number (or a radio frame index), a subframe number (or a subframe index), a slot number (or a slot index), and the like.

A radio frame may be constructed differently according to a duplex mode. For example, in the FDD mode, DL transmission and UL transmission are discriminated according to frequency such that, a radio frame includes only one of a DL subframe or a UL subframe.

On the other hand, in the TDD mode, DL transmission and UL transmission are discriminated according to time such that subframes in a frame are divided into DL and UL subframes.

Figure 11:
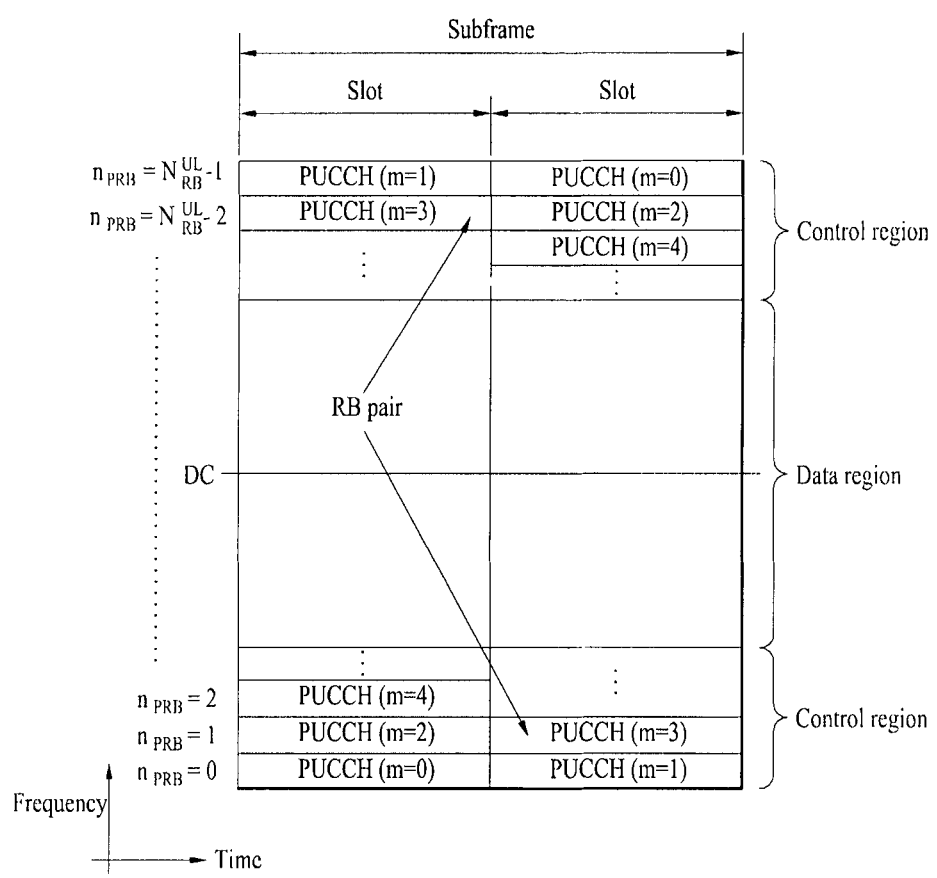
FIG. 11 illustrates an uplink subframe structure.

FIG. 11 shows an uplink subframe structure to which the present invention is applied. As shown in FIG. 11, an uplink subframe may be divided into a control area and a data area in the frequency domain. At least one Physical Uplink Control Channel (PUCCH) may be allocated to the control area to transmit uplink control information (UCI). A Physical Uplink Shared Channel (PUSCH) may also be allocated to the data area to transmit user data. However, when the UE adopts the SC-FDMA scheme in LTE Release 8 or 9, one UE is not allowed to simultaneously transmit a PUCCH and a PUSCH in order to maintain single carrier characteristics.

The size and usage of uplink control information (UCI) transmitted over a PUCCH vary according to PUCCH format. The size of UCI may also vary according to coding rate. For example, the following PUCCH format may be defined.

(1) PUCCH Format 1: Used for On-Off keying (OOK) modulation and Scheduling Request (SR)

(2) PUCCH Formats 1a and 1b: Used for transmission of Acknowledgment/Negative Acknowledgment (ACK/NACK) information 1) PUCCH Format 1a: 1-bit BPSK-modulated ACK/NACK information 2) PUCCH Format 1b: 2-bit QPSK-modulated ACK/NACK information (3) PUCCH Format 2: Used for QPSK modulation and CQI transmission (4) PUCCH Formats 2a and 2b: Used for simultaneous transmission of CQI and ACK/NACK information Table 1 shows modulation schemes and the numbers of bits per subframe according to the PUCCH formats. Table 2 shows the numbers of reference symbols (RSs) per slot according to the PUCCH formats. Table 3 shows the locations of SC-FDMA symbols of RSs according to the PUCCH formats. In Table 1, PUCCH formats 2a and 2b correspond to a normal CP.

TABLE 1

| PUCCH format | Modulation scheme | Number of bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH format | Normal CP | Extended CP |
| --- | --- | --- |
| 1, 1a, 1b | 3 | 2 |
| 2 | 2 | 1 |
| 2a, 2b | 2 | N/A |

TABLE 3

| PUCCH format | SC-FDMA symbol locations of RS | |
| --- | --- | --- |
| | Normal CP | Extended CP |
| 1, 1a, 1b | 2, 3, 4 | 2, 3 |
| 2, 2a, 2b | 1, 5 | 3 |

In a UL subframe, subcarriers distant from a DC (Direct Current) subcarrier are used as a control area. Specifically, subcarriers located at both ends of a UL transmission bandwidth are assigned for UL control information transmission. DC subcarriers remain unused for signal transmission and are mapped to a carrier frequency ($f_0$) in a frequency upconversion process performed by the OFDM/SC-FDMA signal generator.

A PUCCH for a UE is allocated to an RB pair in a subframe and the RBs of the RB pair occupy different subcarriers in two slots. This may be expressed as frequency hopping of an RB pair allocated to a PUCCH over a slot boundary. However, if frequency hopping is not applied, an RB pair occupies the same subcarriers in two slots. Regardless of frequency hopping, a PUCCH for one UE is assigned to an RB pair in one subframe and therefore the same PUCCH is transmitted once per RB, a total of two times, in each slot contained in one subframe.

Hereinafter, an RB pair used for PUCCH transmission in one subframe is referred to as a PUCCH region. In addition, the PUCCH region and codes used in the PUCCH region are referred to as a PUCCH resource. That is, different PUCCH resources may have different PUCCH regions or may have different codes within the same PUCCH region. For ease of explanation, a PUCCH carrying ACK/NACK information is referred to as an ACK/NACK PUCCH, a PUCCH carrying CQI/PMI/RI information is referred to as a Channel State Information (CSI) PUCCH, and a PUCCH carrying SR information is referred to as an SR PUCCH.

The UE receives an allocation of PUCCH resources for UCI transmission from the BS according to an explicit or implicit scheme.

Uplink Control Information (UCI) such as ACK/NACK (acknowledgement/negative acknowledgement), a Channel Quality Indicator (CQI), a Precoding Matrix Indicator (PMI), Rank Information (RI), and a Scheduling Request (SR) may be transmitted over a control area of the UL subframe.

In a wireless communication system, the BS and the UE transmit and receive signals or data to and from each other. If the BS transmits data to the UE, the UE decodes the received data. The UE transmits an ACK to the BS if the data has been successfully decoded and transmits a NACK to the BS if data decoding fails. The same is true for the opposite case, i.e., when the UE transmits data to the BS. In the 3GPP LTE system, the UE receives a PDSCH or the like from the BS and transmits an ACK/NACK for the PDSCH to the BS through an implicit PUCCH determined based on a PDCCH which carries scheduling information of the PDSCH. Here, if the UE does not receive data, this may be considered a discontinuous transmission (DTX) state or may be handled as a state in which there is no received data or may be handled in the same manner as when a NACK is provided (i.e., as when decoding is unsuccessful although data has been received) according to a predetermined rule.

Figure 12:
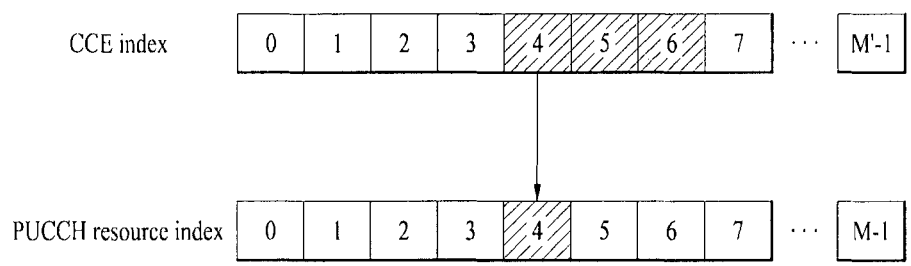
FIG. 12 illustrates an example for determining a PUCCH for ACK/NACK transmission.

FIG. 12 shows an example for determining a PUCCH for an ACK/NACK to which the present invention is applied.

A PUCCH resource for ACK/NACK information is not previously allocated to each UE and multiple UEs located in a cell use a plurality of PUCCH resources in a divided manner at every time point. More specifically, a PUCCH resource used for ACK/NACK transmission of a UE is implicitly determined based on a PDCCH that carries scheduling information of a PDSCH that carries corresponding DL data. An entire region for transmitting a PDCCH in a DL subframe includes a plurality of Control Channel Elements (CCEs) and a PDCCH that is transmitted to the UE includes one or more CCEs. Each CCE includes a plurality of Resource Element Groups (REGs) (e.g., 9 REGs). One REQ is constructed of four neighbor REs when a reference signal (RS) is excluded. The UE transmits ACK/NACK information through an implicit PUCCH resource that is derived or calculated using a function of a specific CCE index (e.g., the first or lowest CCE index) from among CCEs that constitute a PDCCH received by the UE.

As shown in FIG. 12, the lowest CCE index of the PDCCH corresponds to a PUCCH resource index for ACK/NACK transmission. As shown in FIG. 12, when it is assumed that PDCCH scheduling information is transmitted to the UE through a PDCCH that consists of 4 to 6-indexed CCEs, the UE transmits an ACK/NACK to the BS through a PUCCH derived or calculated from the 4-indexed CCE, which is the lowest CCE of the PDCCH, for example, through a 4-indexed PUCCH resource.

FIG. 12 shows an example in which up to M' CCEs are present in a DL subframe and up to M PUCCH resources are present in a UL subframe. Although M' may be identical to M (M'=M), M' may be different from M and CCEs and PUCCH resources may be mapped in an overlapping manner. For example, a PUCCH resource index may be determined as follows.

$$n_{PUCCH}^{(1)} = n_{CCE} + N_{PUCCH}^{(1)}$$ [Expression 1]

In Expression 1, $n_{PUCCH}^{(1)}$ is a PUCCH resource index for ACK/NACK information transmission, $N_{PUCCH}^{(1)}$ is a signal value received from a higher layer, and $n_{CCE}$ indicates the lowest CCE index used for PDCCH transmission.

Figure 13:
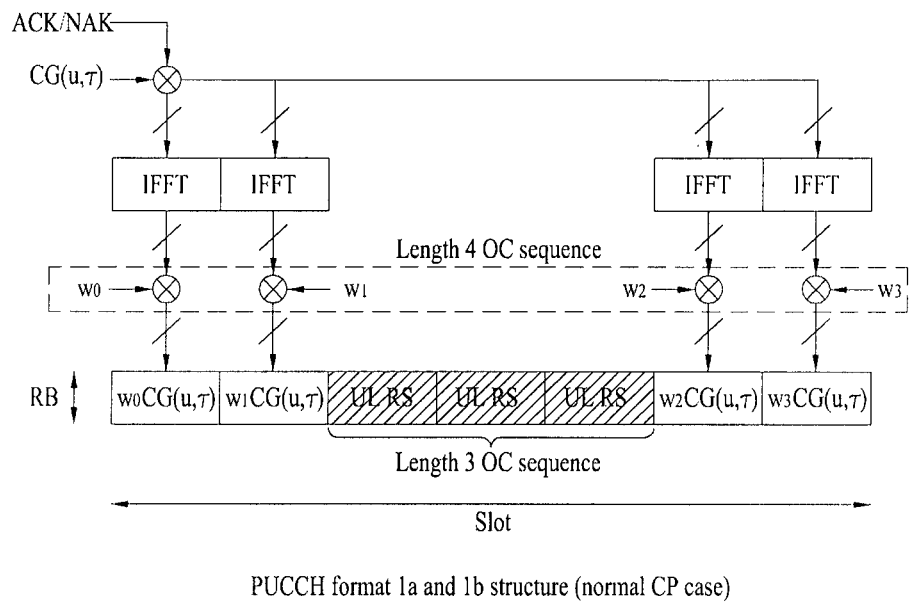
FIGS. 13 and 14 illustrate slot level structures of PUCCH formats 1a and 1b for ACK/NACK transmission.
Figure 14:
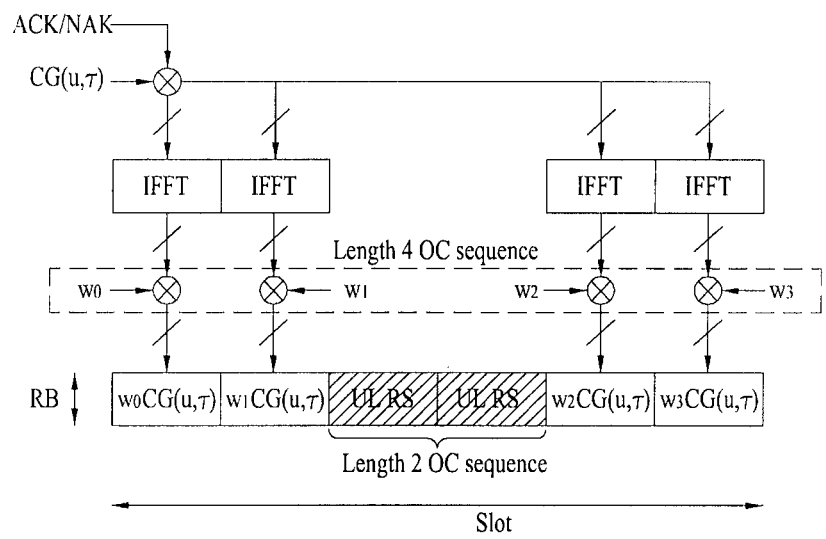

FIGS. 13 and 14 illustrate slot level structures of PUCCH formats 1a and 1b for ACK/NACK transmission.

FIG. 13 shows a PUCCH format 1a and 1b structure in the case of a normal CP. FIG. 14 shows a PUCCH format 1a and 1b structure in the case of an extended CP. In the PUCCH format 1a and 1b structure, the same control information is repeated in each slot within a subframe. UEs transmit ACK/NACK signals through different resources that include orthogonal covers or orthogonal cover codes (OCs or OCCs) and different cyclic shifts (i.e., different frequency domain codes) of a Computer-Generated Constant Amplitude Zero Auto Correlation (CG-CAZAC) sequence. For example, the OCs may include orthogonal Walsh/DFT codes. When the number of CSs is 6 and the number of OCs is 3, a total of 18 UEs may be multiplexed in the same Physical Resource Block (PRB) based on a single antenna. Orthogonal sequences w0, w1, w2, and w3 may be applied to an arbitrary time domain (after FFT modulation) or an arbitrary frequency domain (before FFT modulation). The slot level structure of PUCCH format 1 for Scheduling Request (SR) transmission is identical to that of PUCCH formats 1a and 1b with the difference being the modulation method.

For an ACK/NACK for SR transmission and semi-persistent scheduling (SPS), PUCCH resources composed of CSs, CCs and PRBs may be assigned to UEs through Radio Resource Control (RRC) signaling. As previously illustrated in FIG. 12, for both dynamic ACK/NACK (or ACK/NACK for non-persistent scheduling) feedback and ACK/NACK feedback for a PDCCH indicating SPS release, a PUCCH resource may be implicitly assigned to the UE using a PDCCH corresponding to the PDSCH or the lowest CCE index of a PDCCH for SPS release.

Figure 15:
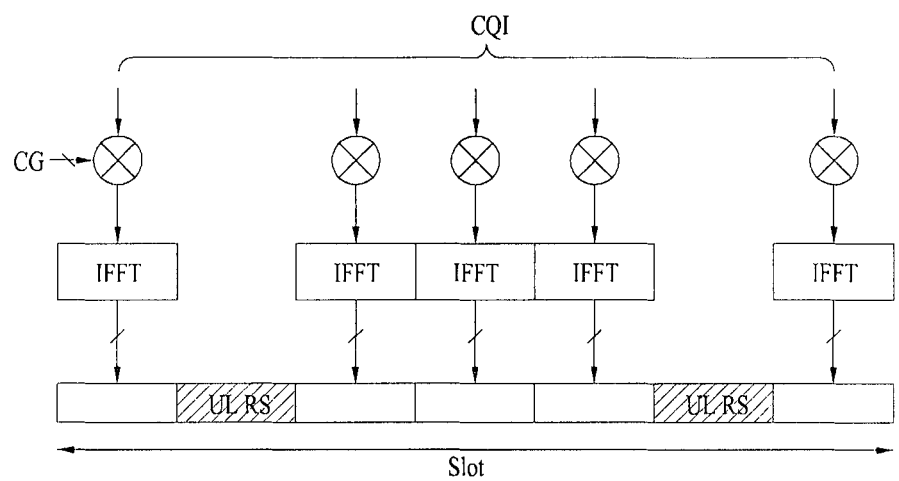
FIG. 15 illustrates a PUCCH format 2/2a/2b structure in the case of a normal CP.
Figure 16:
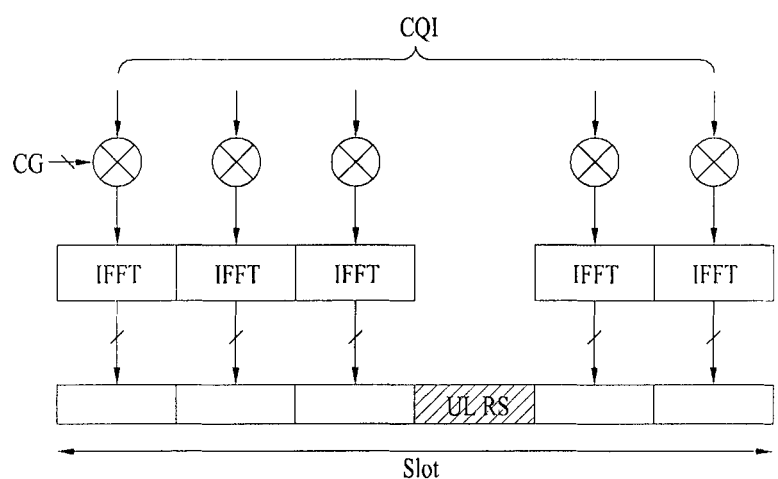
FIG. 16 illustrates a PUCCH format 2/2a/2b structure in the case of an extended CP.

FIG. 15 shows a PUCCH format 2/2a/2b structure in the case of the normal CP. FIG. 16 shows a PUCCH format 2/2a/2b structure in the case of the extended CP. As shown in FIGS. 15 and 16, one subframe includes 10 QPSK data symbols in addition to an RS symbol in the normal CP case. Each QPSK symbol is spread in the frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in the PUCCH formats 1/1a/1b and 2/2a/2b, a plurality of UEs may be multiplexed by CS+OC+PRB and CS+PRB.

Length-4 and length-3 orthogonal sequences (OCs) for PUCCH formats 1/1a/1b are shown in the following Tables 4 and 5.

TABLE 4

| Sequence index | Orthogonal sequences |
| --- | --- |
| 0 | [+1 +1 +1 +1] |
| 1 | [+1 −1 +1 −1] |
| 2 | [+1 −1 −1 +1] |

TABLE 5

| Sequence index | Orthogonal sequences |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The orthogonal sequences (OCs) for the RS in the PUCCH formats 1/1a/1b are shown in Table 6.

TABLE 6

| Sequence index | Normal CP | Extended CP |
| --- | --- | --- |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 illustrates ACK/NACK channelization for the PUCCH formats 1a and 1b when $\Delta_{shift}^{PUCCH}=2$.

Figure 18:
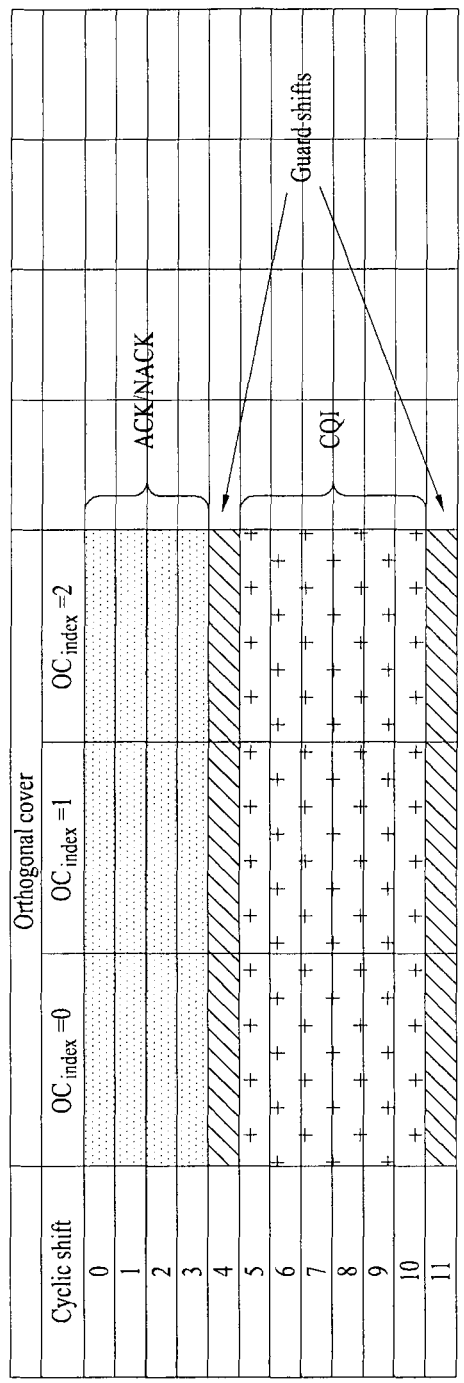
FIG. 18 illustrates channelization of a structure in which PUCCH formats 1/1a/1b and PUCCH formats 2/2a/2b are mixed within the same PRB.

FIG. 18 illustrates channelization of a structure in which PUCCH formats 1/1a/1b and PUCCH formats 2/2a/2b are mixed within the same PRB.

CS (Cyclic Shift) hopping and OC (Orthogonal Cover) remapping may be applied as follows.

(1) Symbol-based cell-specific CS hopping for inter-cell interference randomization (2) Slot level CS/OC remapping 1) For inter-cell interference randomization 2) Slot-based access for mapping between ACK/NACK channels and resources (k)

A resource nr for the PUCCH formats 1/1a/1b includes the following combination.

(1) CS (=DFT OC in a symbol level) (ncs)

(2) OC (OC in a slot level) (noc)

(3) Frequency RB (nrb)

When indexes representing the CS, the OC and the RB are $n_{cs}$, $n_{oc}$, and $n_{rb}$, a representative index $n_r$ includes $n_{cs}$, $n_{oc}$ and $n_{rb}$. That is, $n_r=(n_{cs}, n_{oc}, n_{rb})$ A CQI, a PMI, an RI, and a combination of a CQI and an ACK/NACK may be transmitted through the PUCCH formats 2/2a/2b. Here, Reed Muller (RM) channel coding may be applied.

For example, in the LTE system, channel coding for a UL CQI is described as follows. A bit stream $a_0, a_1, a_2, a_3, \ldots, a_{A-1}$ is channel-coded using a (20, A) RM code. Table 7 shows a base sequence for the (20, A) code. $a_0$ and $a_{A-1}$ represent a Most Significant Bit (MSB) and a Least Significant Bit (LSB), respectively. In the extended CP case, the maximum number of information bits is 11, except when the CQI and the ACK/NACK are simultaneously transmitted. After the bit stream is coded into 20 bits using the RM code, QPSK modulation may be applied to the coded bits. Before QPSK modulation, the coded bits may be scrambled.

TABLE 7

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
| --- | --- | --- | --- | --- | --- | --- | --- | --- | --- | --- | --- | --- | --- |
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |

TABLE 7-continued

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 5  | 1 | 1 | 0 | 0 | 1 | 0 | 1 | 1 | 1 | 0 | 1 | 1 | 1 |
| 6  | 1 | 0 | 1 | 0 | 1 | 0 | 1 | 0 | 1 | 1 | 1 | 1 | 1 |
| 7  | 1 | 0 | 0 | 1 | 1 | 0 | 0 | 1 | 1 | 0 | 1 | 1 | 1 |
| 8  | 1 | 1 | 0 | 1 | 1 | 0 | 0 | 1 | 0 | 1 | 1 | 1 | 1 |
| 9  | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 0 | 1 | 1 | 0 | 1 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by Expression 2.

$$b_i = \sum_{n=0}^{A-1} (a_n \cdot M_{i,n}) \bmod 2 \quad \text{[Expression 2]}$$

where, i=0, 1, 2, . . . , B−1.

Table 8 shows an uplink control information (UCI) field for broadband report (single antenna port, transmit diversity or open loop spatial multiplexing PDSCH) CQI feedback.

TABLE 8

| Field | bandwidth |
|---|---|
| Broadband CQI | 4 |

Table 9 shows a UCI field for broadband CQI and PMI feedback. The field reports closed loop spatial multiplexing PDSCH transmission.

TABLE 9

| | Bandwidth | | | |
|---|---|---|---|---|
| | 2 antenna ports | | 4 antenna ports | |
| Field | Rank = 1 | Rank = 2 | Rank = 1 | Rank > 1 |
| Broadband CQI | 4 | 4 | 4 | 4 |
| Spatial differential CQI | 0 | 3 | 0 | 3 |
| PMI (Precoding Matrix Index) | 2 | 1 | 4 | 4 |

Table 10 shows a UCI field for RI feedback for broadband report.

TABLE 10

| | Bit widths | | |
|---|---|---|---|
| | | 4 antenna ports | |
| Field | 2 antenna ports | Up to two layers | Up to four layers |
| RI (Rank Indication) | 1 | 1 | 2 |

Figure 19:
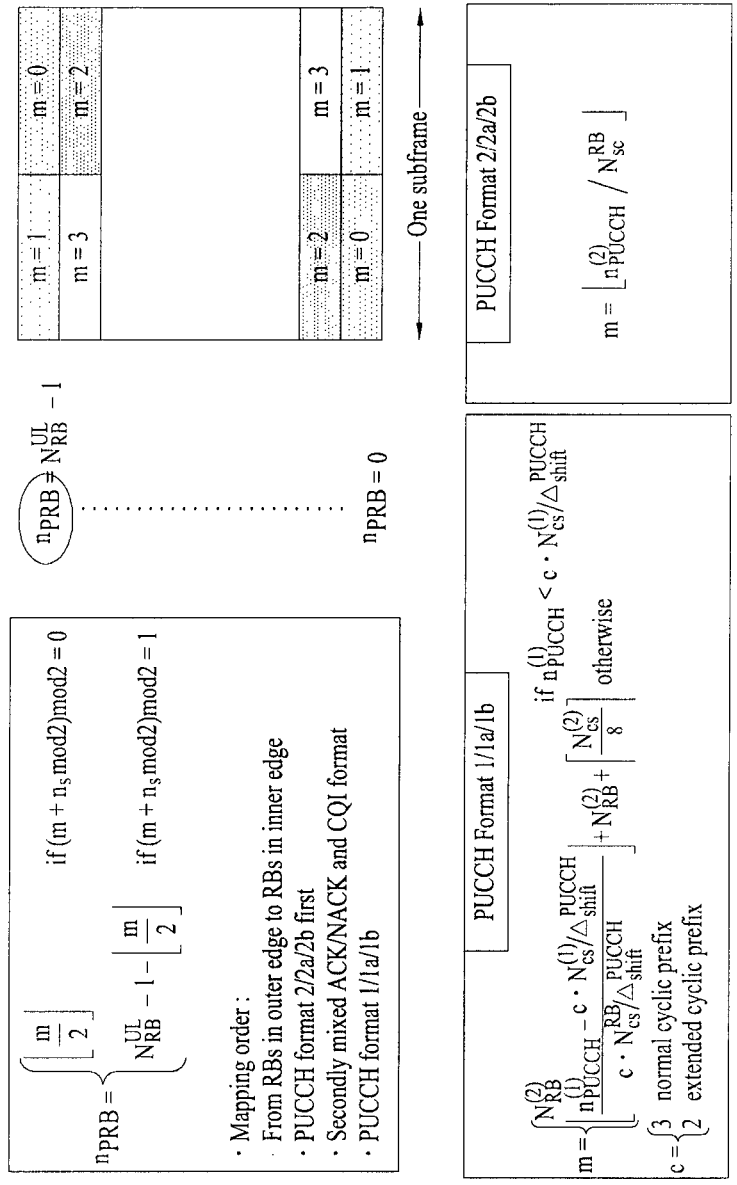
FIG. 19 illustrates Physical Resource Block (PRB) allocation.

FIG. 19 shows PRB allocation. As shown in FIG. 19, the PRB may be used for PUCCH transmission in slot $n_s$.

The term "multi-carrier system" or "carrier aggregation system" refers to a system for aggregating and utilizing a plurality of carriers having a bandwidth smaller than a target bandwidth for broadband support. When a plurality of carriers having a bandwidth smaller than a target bandwidth is aggregated, the bandwidth of the aggregated carriers may be limited to a bandwidth used in the existing system for backward compatibility with the existing system. For example, the existing LTE system may support bandwidths of 1.4, 3, 5, 10, 15 and 20 MHz and an LTE-Advanced (LTE-A) system evolved from the LTE system may support a bandwidth greater than 20 MHz using only the bandwidths supported by the LTE system. Alternatively, regardless of the bandwidths used in the existing system, a new bandwidth may be defined so as to support carrier aggregation. The term "Multi-carrier" may be used interchangeably with "carrier aggregation" and "bandwidth aggregation". The term "carrier aggregation" may refer to both contiguous carrier aggregation and non-contiguous carrier aggregation. The term "carrier aggregation" may also refer to both intra-band carrier aggregation and inter-band carrier aggregation.

Figure 20:
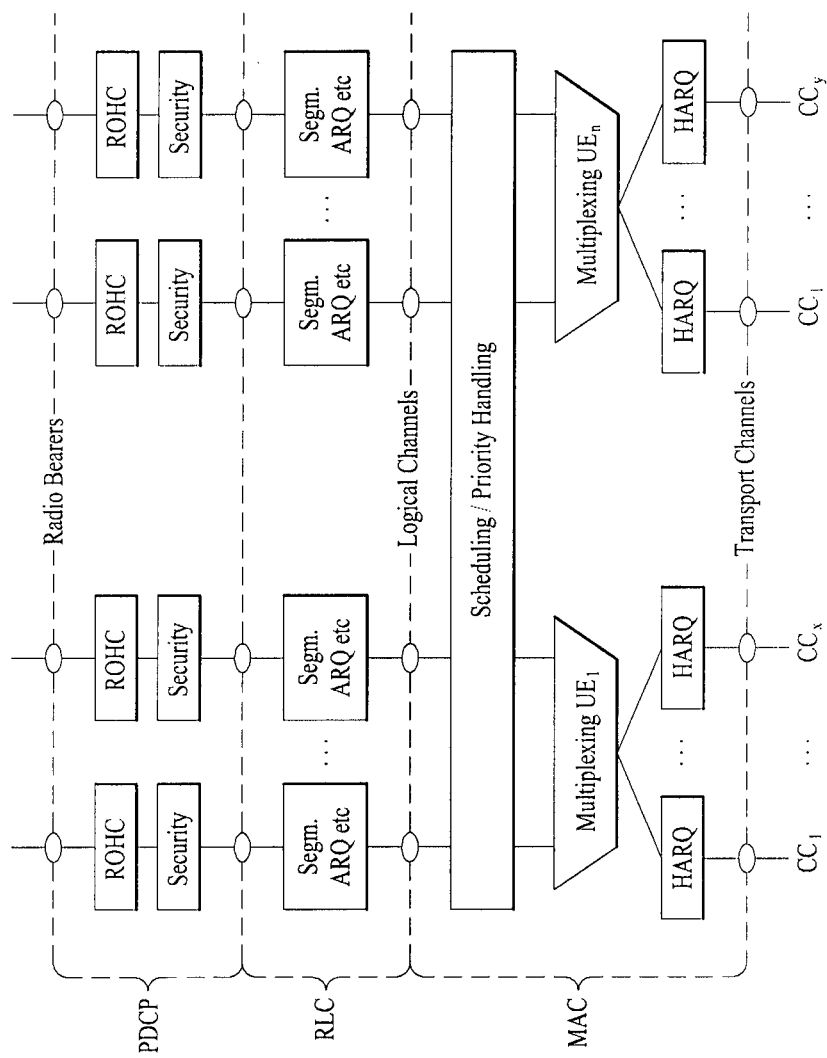
FIG. 20 illustrates a scheme of management of downlink component carriers (DL CCs) in a BS.
Figure 21:
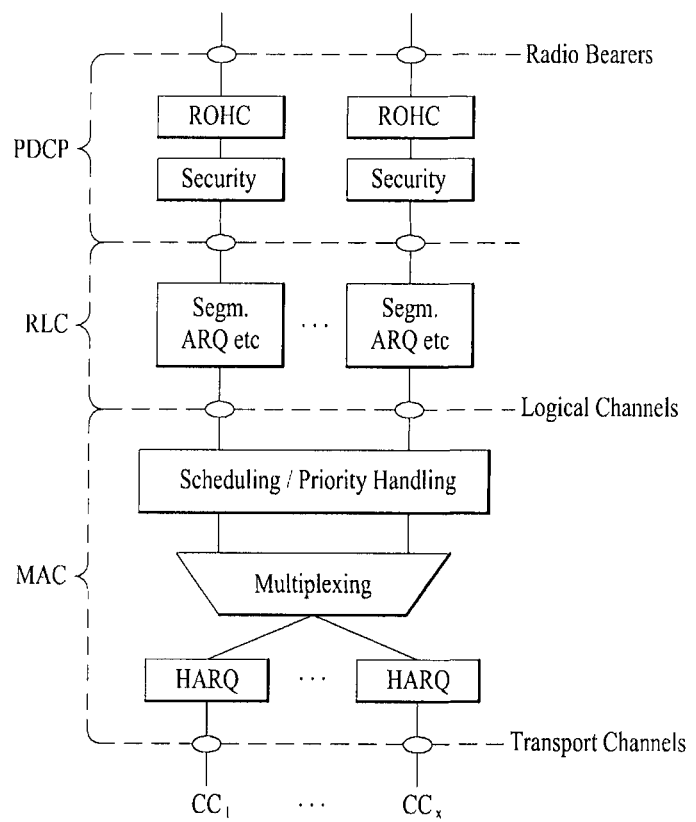
FIG. 21 illustrates a scheme of management of uplink component carriers (UL CCs) in a UE.

FIG. 20 illustrates a scheme of management of downlink component carriers (DL CCs) in a base station (BS) and FIG. 21 illustrates a scheme of management of uplink component carriers (UL CCs) in a user equipment (UE). For ease of explanation, the higher layer is simply described as a MAC (or a MAC entity) in the following description.

Figure 22:
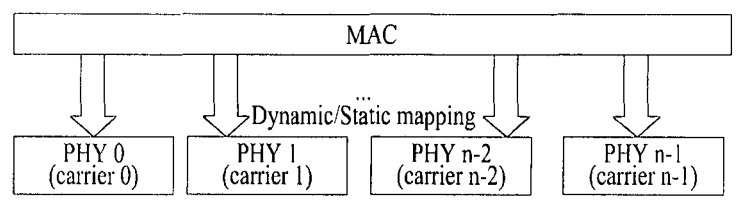
FIG. 22 illustrates a scheme of management of multiple carriers by one MAC entity in a BS.
Figure 23:
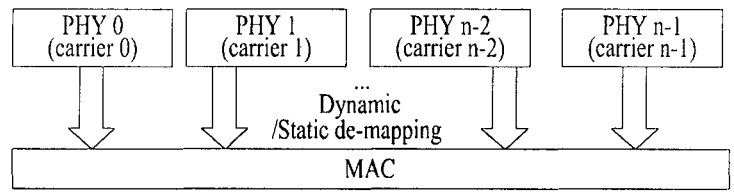
FIG. 23 is a conceptual diagram of management of multiple carriers by one MAC entity in a UE.

FIG. 22 illustrates a scheme of management of multiple carriers by one MAC entity in a BS. FIG. 23 is a conceptual diagram of management of multiple carriers by one MAC entity in a UE.

As shown in FIGS. 22 and 23, one MAC manages and operates one or more frequency carriers to perform transmission and reception. Frequency carriers managed by one MAC need not be contiguous to each other such that they are more flexible in terms of resource management. In FIGS. 22 and 23, it is assumed that one PHY (or PHY entity) corresponds to one component carrier (CC) for ease of explanation. One PHY does not always indicate an independent radio frequency (RF) device. Although one independent RF device generally corresponds to one PHY, the present invention is not limited thereto and one RF device may include a plurality of PHYs.

Figure 24:
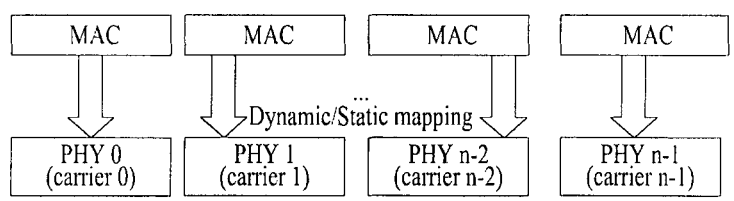
FIG. 24 illustrates a scheme of management of multiple carriers by a plurality of MAC entities in a BS.
Figure 25:
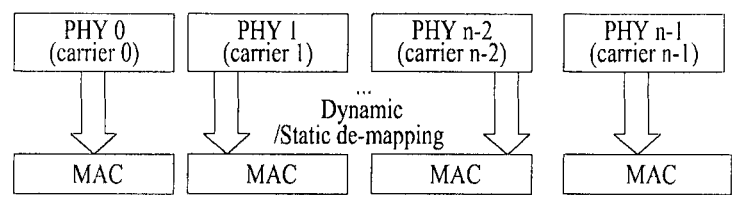
FIG. 25 illustrates a scheme of management of multiple carriers by a plurality of MAC entities in a UE.
Figure 26:
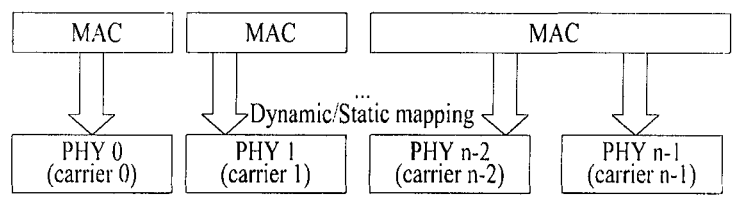
FIG. 26 illustrates another scheme of management of multiple carriers by a plurality of MAC entities in a BS.
Figure 27:
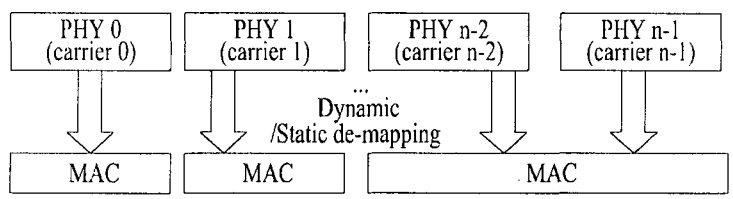
FIG. 27 illustrates another scheme of management of multiple carriers by a plurality of MAC entities in a UE.

FIG. 24 illustrates a scheme of management of multiple carriers by a plurality of MAC entities in a BS. FIG. 25 illustrates a scheme of management of multiple carriers by a plurality of MAC entities in a UE. FIG. 26 illustrates another scheme of management of multiple carriers by a plurality of MAC entities in a BS. FIG. 27 illustrates another scheme of management of multiple carriers by a plurality of MAC entities in a UE.

Unlike the structures of FIGS. 22 and 23, a number of carriers may be controlled by a number of MAC entities rather than by one MAC as shown in FIGS. 24 to 27.

As shown in FIGS. 24 and 25, carriers may be controlled by MACs on a one to one basis. As shown in FIGS. 26 and 27, some carriers may be controlled by MACs on a one to one basis and one or more remaining carriers may be controlled by one MAC.

The above-mentioned system includes a plurality of carriers (i.e., 1 to N carriers) and carriers may be used so as to be contiguous or non-contiguous to each other. This scheme may be equally applied to UL and DL. The TDD system is constructed so as to manage N carriers, each including downlink and uplink transmission, and the FDD system is constructed such that multiple carriers are applied to each of uplink and downlink. The FDD system may also support asymmetrical carrier aggregation in which the numbers of carriers aggregated in uplink and downlink and/or the bandwidths of carriers in uplink and downlink are different.

When the number of component carriers (CCs) aggregated in uplink (UL) is identical to the number of CCs aggregated in downlink (DL), all CCs may be configured so as to be compatible with the conventional system. However, this does not mean that CCs that are configured without taking into consideration such compatibility are excluded from the present invention.

Figure 28:
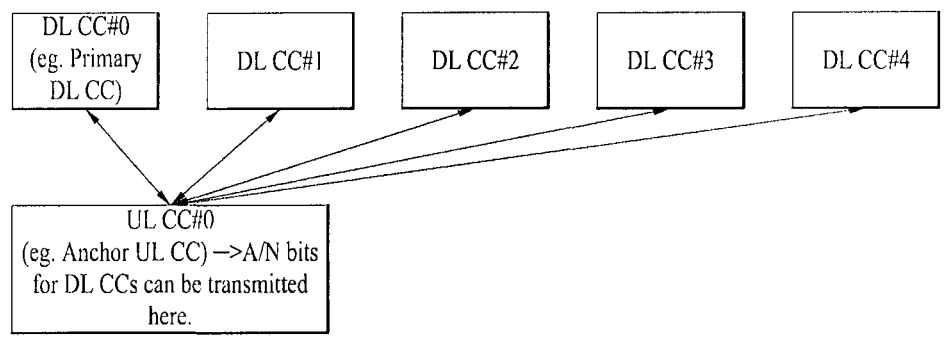
FIG. 28 illustrates an asymmetric carrier aggregation which includes 5 DL CCs and one UL CC.

FIG. 28 shows an asymmetric carrier aggregation which includes 5 DL CCs and one UL CC. The illustrated asymmetric carrier aggregation may be set from the viewpoint of UCI transmission. Specific UCIs (e.g., ACK/NACK responses) of multiple DL CCs are grouped and transmitted within one UL CC. In addition, even when multiple UL CCs are configured, specific UCIs (e.g., ACK/NACK responses to DL CCs) are transmitted through a predetermined UL CC (e.g., a primary CC, a primary cell, or a Pcell). If it is assumed for ease of explanation that each DL CC can carry up to two codeword blocks and the number of ACK/NACK responses for each CC depends on the maximum number of codewords set for each CC (since, for example, if the maximum number of codewords set by the BS at a specific CC is 2, the number of associated ACK/NACK responses is set to 2 which is the maximum number of codewords per CC even when a specific PDCCH uses only one codeword at the CC), at least two UL ACK/NACK bits are needed for each DL CC. In this case, in order to transmit an ACK/NACK for data received through 5 DL CCs through one UL CC, at least 10 ACK/NACK bits are needed. In order to separately discriminate a discontinuous transmission (DTX) state for each DL CC, at least 12 bits ($=5^5=3125=11.61$ bits) are needed for ACK/NACK transmission. The conventional PUCCH format 1a/1b structure cannot transmit such extended ACK/NACK information since the conventional PUCCH format 1a/1b structure can transmit up to 2 ACK/NACK bits. Although carrier aggregation has been illustrated as a cause of an increase in the amount of UCI information for ease of explanation, the amount of UCI information may also be increased due to an increase in the number of antennas and the presence of a backhaul subframe in a TDD system or a relay system. Similar to the case of ACK/NACK, the amount of control information that should be transmitted is increased even when control information associated with a plurality of DL CCs is transmitted through one UL CC. For example, UCI payload may be increased when there is a need to transmit a CQI/PMI/RI for a plurality of DL CCs. Although ACK/NACK information for a codeword has been illustrated in the present invention, it will be apparent that a transmission block corresponding to the codeword is present and the same method can be applied to ACK/NACK information for the transmission block.

A UL anchor CC (also referred to as a UL primary CC (PCC)) shown in FIG. 28 is a CC for transmitting PUCCH resources or UCI and may be cell-specifically or UE-specifically determined. For example, the UE may determine a CC, which attempts to perform an initial random access, to be a primary CC. In this case, the DTX status may be explicitly fed back and may be fed back so as to share the same state as that of a NACK.

LTE-A uses the concept of the cell to manage wireless resources. The cell is defined as a combination of DL resources and UL resources. Here, UL resources are optional. Therefore, the cell may be composed of only DL resources or may be composed of DL resources and UL resources. When carrier aggregation is supported, a linkage between a DL resource carrier frequency (or DL CC) and a UL resource carrier frequency (or UL CC) may be indicated by system information. A cell that operates with the primary frequency resource (or PCC) may be referred to as a primary cell (PCell), and a cell that operates with a secondary frequency resource (or SCC) may be referred to as a secondary cell (SCell). The PCell may indicate a cell that is used when a UE performs an initial connection setup process or a connection re-setup process. PCell may also indicate a cell indicated in a handover procedure. In LTE-A release 10, only one PCell may be present when carrier aggregation is applied. The SCell may be configured after an RRC connection setup is performed and may be used to provide additional wireless resources. PCell and SCell may be collectively referred to as a serving cell. Therefore, in the case of a UE for which a carrier aggregation has not been set or which does not support carrier aggregation although the UE is in an RRC_CONNECTED state, only one serving cell, which consists of only a PCell, is present. On the other hand, in the case of a UE which is in an RRC_CONNECTED state and for which a carrier aggregation has been set, one or more serving cells are present and one PCell and one or more SCells are included in the serving cells. To support carrier aggregation, after an initial security activation process is started, the network may construct one or more SCells in addition to a PCell, which is constructed in a connection setup procedure, for a UE which supports carrier aggregation. Accordingly, a PCC corresponds to a PCell, a primary (radio) resource and a primary frequency resource and these terms may be used interchangeably. Similarly, an SCC corresponds to an SCell, a secondary (radio) resource, or a secondary frequency resource and these terms may be used interchangeably.

Multiple carriers in a carrier aggregation are divided into a PCell and an SCell(s) which are UE-specific parameters.

A specific UE may have one or more configured serving cells and, when a plurality of configured serving cells is present, one of the cells serves as a PCell and the remaining cells serve as SCells.

Here, the PCell may be set to a cell having the smallest (or lowest) cell index among a plurality of cell indices (for example, ServCellIndex). In the case of TDD in LTE-A Rel-10, let us assume that, when a UE has a plurality of configured serving cells, all cells have the same UL-DL configuration.

The UE may transmit a plurality of uplink control information such as a HARQ ACK/NACK and Channel State Information (CSI) (which is a term collectively referring to CQI, RI, and PMI) received/detected or measured from one or more CCs.

For example, the UE collects (for example, multiplexes or bundles) responses for the cases which require a plurality of ACK/NACK feedbacks received from a PCell DL CC and an SCell(s) DL CC and transmits the collected responses using one PUCCH at a UL CC in the PCell.

In LTE, the cases which require HARQ ACK/NACK feedback for a DL CC may be classified into 3 main cases.

1. Transmission of a PDSCH(s) Indicated Through Detection Corresponding to a PDCCH(s) in a Subframe(s)$_{n-k}$ Here, k∈K and K is a set of M elements $\{k_0, k_1, \ldots k_{M-1}\}$ determined by subframe n and the UL-DL configuration. This case corresponds to a PDSCH(s) which requires general A/N feedback. In LTE-A Rel-10, such a PDSCH may be present in both DL PCell and SCells. In the following description, this case is referred to as a "PDSCH with PDCCH" for ease of explanation.

2. Transmission of a PDCCH(s) which Indicates Downlink SPS Release in a Subframe(s)$_{n-k}$ Here, k∈K and K is a set of M elements $\{k_0, k_1, \ldots k_{M-1}\}$ determined by subframe n and the UL-DL configuration. This case corresponds to provision of A/N feedback for a PDCCH(s) for SPS release. In LTE, one PDSCH without a corresponding PDCCH may be present when A/N feedback is performed once. In addition, A/N feedback for a PDCCH(s) indicating DL SPS activation is not performed although A/N feedback for a PDCCH(s) indicating DL SPS release is performed. In LTE-A Rel-10, such a PDCCH may be present only within a DL PCell. In the following description, this case is referred to as "DL SPS release" for ease of explanation.

3. Transmission of a PDSCH(s) which is not Associated with a PDCCH Detected in a Subframe(s)$_{n-k}$ Here, k∈K and K is a set of M elements $\{k_0, k_1, \ldots k_{M-1}\}$ determined by subframe n and the UL-DL configuration. This case corresponds to provision of A/N feedback for Semi-Persistent Scheduling (SPS) through a PDSCH(s) with a PDCCH(s). In LTE Rel-8, one PDSCH without a corresponding PDCCH may be present when A/N feedback is performed once. In LTE-A Rel-10, such a PDSCH may be present only within a DL PCell. In the following description, this case is referred to as "DL SPS" for ease of explanation.

In each of the above cases, M denotes the number of elements of the set K and the set K may be defined as shown in the following Table 11.

TABLE 11

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the case of FDD, M is always 1 and the set K is always $\{k_0\}=\{4\}$.

The present invention suggests a method for effectively transmitting extended (or an increased amount of) UL control information (UCI), which is described below with reference to the accompanying drawings. Specifically, the present invention suggests a new PUCCH format/signal processing procedure/resource allocation method for transmitting extended UL control information (UCI). For ease of explanation, the new PUCCH format proposed by the present invention is referred to as a Carrier Aggregation (CA) PUCCH format or as a PUCCH format 3 taking into consideration that up to PUCCH format 2 has been defined in the conventional LTE Release 8/9. The technical concept of the PUCCH format proposed in the present invention can be easily applied to an arbitrary physical channel (e.g., a PUSCH) capable of transmitting UL control information (UCI) in the same or similar manner. For example, the embodiments of the present invention can be applied to a periodic PUSCH structure for periodically transmitting control information or to an aperiodic PUSCH structure for aperiodically transmitting control information.

The following drawings and embodiments are described mainly with reference to the case in which a UCI/RS symbol structure of the PUCCH format 1/1a/1b (normal CP) of the conventional LTE is used as a UCI/RS symbol structure of the subframe/slot level applied to the PUCCH format 3. However, the subframe/slot-level UCI/RS symbol structure in the PUCCH format 3 has been defined for illustrative purposes for ease of explanation and the present invention is not limited to such a specific structure. In the PUCCH format 3 according to the present invention, the number of UCI/RS symbols, the positions of the UCI/RS symbols, or the like may be freely modified according to system design. For example, the PUCCH format 3 according to the embodiment of the present invention may be defined using RS symbol structures of the PUCCH formats 2/2a/2b of the conventional LTE.

The PUCCH format 3 according to the embodiment of the present invention may be used to transmit an arbitrary type/size of uplink control information (UCI). For example, the PUCCH format 3 according to the embodiment of the present invention may transmit a variety of information such as HARQ ACK/NACK, CQI, PMI, RI, and SR and these information items may have an arbitrary payload size. For ease of explanation, the following drawings and embodiments are described mainly with reference to the case in which the PUCCH format 3 according to the present invention transmits ACK/NACK information.

FIGS. 29 to 32 illustrate a PUCCH format 3 and an associated signal processing procedure that may be used in the present invention. Specifically, FIGS. 29 to 32 illustrate a DFT-based PUCCH format structure. According to the DFT-based PUCCH structure, DFT precoding is performed on a PUCCH and the PUCCH is then transmitted after a time domain orthogonal cover (OC) is applied at an SC-FDMA level. In the following description, the DFT-based PUCCH format is referred to as a PUCCH format 3.

Figure 29:
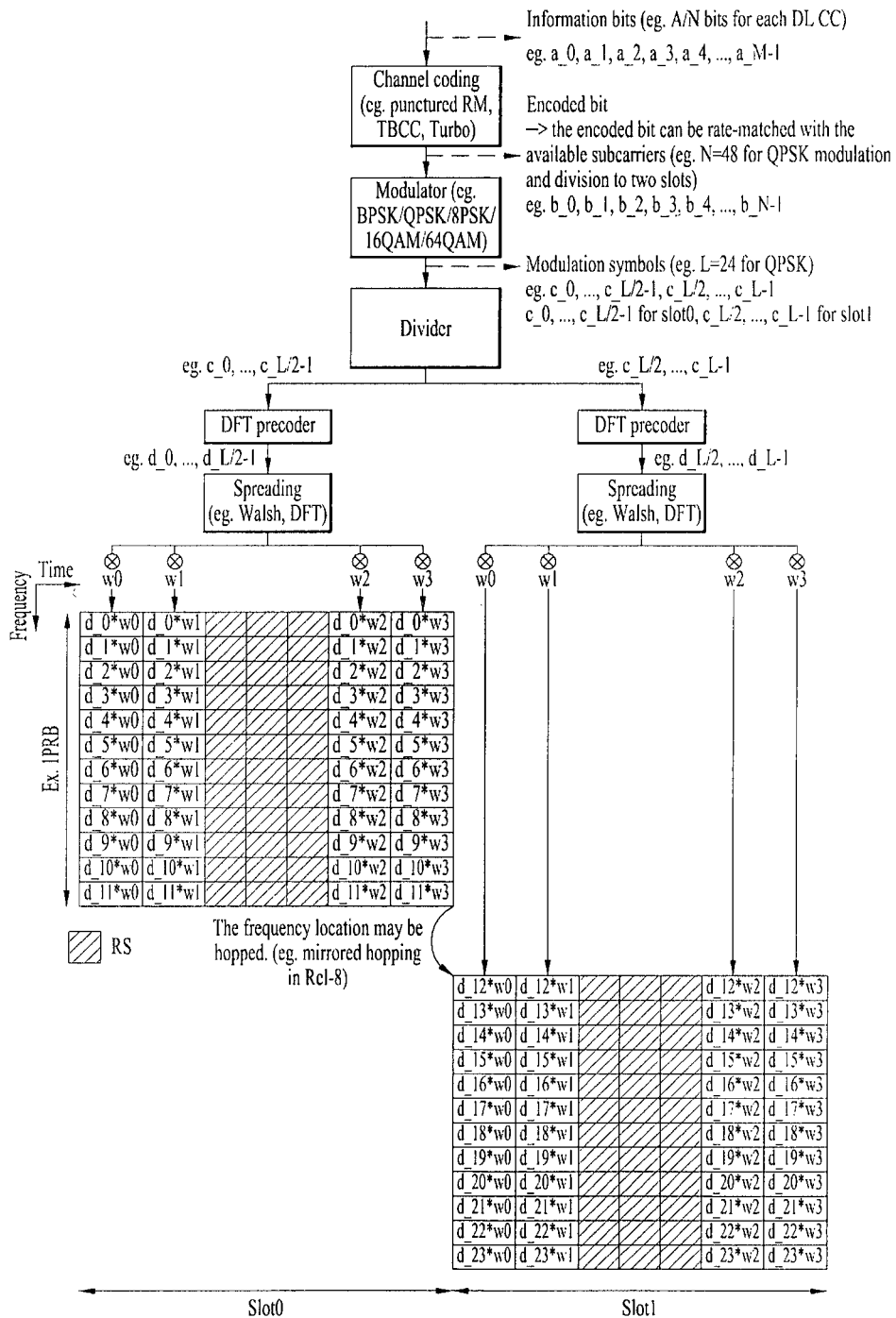
FIGS. 29 to 32 illustrate a PUCCH format 3 and an associated signal processing procedure to which the present invention is applied.

FIG. 29 illustrates a PUCCH format 3 structure that uses an orthogonal code (OC) of SF=4. As shown in FIG. 29, a channel coding block performs channel coding on transmission bits (a_1, . . . , a_M−1) (e.g., multiple ACK/NACK bits) to generate encoded bits (coded bits or coding bits)(or codeword) (b_0, b_1, . . . , b_N−1). Here, M represents the size of the transmission bits, and N represents the size of the coding bits. The transmission bits may include UCI, for example, multiple ACKs/NACKs for multiple data (or PDSCHs) received through multiple DL CCs. Here, the transmission bits (a_0, a_1, . . . , a_M−1) are joint-coded regardless of the type, number, or size of UCIs that constitute the transmission bits. For example, when the transmission bits include multiple ACK/NACK data for a plurality of DL CCs, channel coding is not performed per DL CC or per ACK/NACK bit but is instead performed for the entire bit information, thereby generating a single codeword. Channel coding may include, without being limited to, simple repetition, simplex coding, Reed Muller (RM) coding, punctured RM coding, tail-biting convolutional coding (TBCC), low-density parity-check (LDPC) or turbo-coding. Although not shown in the drawings, the encoded bits may be rate-matched taking into consideration modulation order and the amount of resources. The rate matching function may be incorporated into the channel coding block or may be performed through a separate functional block. For example, the channel coding block may perform RM coding of (32,0) for a plurality of control information to obtain a single codeword and cyclic buffer rate-matching for the obtained codeword may then be performed on the single codeword.

A modulator modulates the coded bits ($b\_0, b\_1, \ldots, b\_N-1$) to generate modulation symbols ($c\_0, c\_1, \ldots, c\_L-1$). L is the size of the modulation symbols. The modulation method is performed by modifying the size and phase of a transmission (Tx) signal. For example, the modulation method includes n-PSK (Phase Shift Keying), n-QAM (Quadrature Amplitude Modulation), where n is an integer greater than 1. Specifically, the modulation method may include Binary PSK (BPSK), Quadrature PSK (QPSK), 8-PSK, QAM, 16-QAM, 64-QAM, etc.

A divider distributes the modulation symbols ($c\_0, c\_1, \ldots, c\_L-1$) to slots. The order/pattern/scheme for distributing the modulation symbols to slots are not specifically limited. For example, the divider may sequentially distribute the modulation symbols to slots in order of increasing slot number (according to a localized scheme). In this case, as shown in the drawings, the modulation symbols ($c\_0, c\_1, \ldots, c\_L/2-1$) may be distributed to slot 0 and the modulation symbols ($c\_L/2, c\_L/2+1, \ldots, c\_L-1$) may be distributed to slot 1. In addition, the modulation symbols may be interleaved (or permuted) when they are distributed to slots. For example, even modulation symbols may be distributed to slot 0 and odd modulation symbols may be distributed to slot 1. The modulation process and the division process may be performed in reverse order.

A DFT precoder performs DFT precoding (e.g., 12-point DFT) on the modulation symbols distributed to slots in order to generate a single carrier waveform. Referring to the drawings, the modulation symbols ($c\_0, c\_1, \ldots, c\_L/2-1$) distributed to slot 0 may be DFT-precoded into DFT symbols ($d\_0, d\_1, \ldots, d\_L/2-1$), and the modulation symbols ($c\_L/2, c\_L/2+1, \ldots, c\_L-1$) distributed to slot 1 may be DFT-precoded into DFT symbols ($d\_L/2, d\_L/2+1, \ldots, d\_L-1$). DFT precoding may be replaced with a different linear operation (e.g., Walsh precoding).

A spreading block spreads the DFT-processed signal at an SC-FDMA symbol level (in the time domain). The time domain spreading at the SC-FDMA symbol level is performed using a spread code (sequence). The spread code includes a quasi-orthogonal code and an orthogonal code. The quasi-orthogonal code may include, without being limited to, a Pseudo Noise (PN) code. The orthogonal code may include, without being limited to, a Walsh code and a DFT code. Although this specification has been described with reference to the orthogonal code as a representative example of the spread code for ease of explanation, the orthogonal code may be replaced with a quasi-orthogonal code. The maximum value of the spread code size (or a spreading factor (SF)) is limited by the number of SC-FDMA symbols used for control information transmission. For example, when four SC-FDMA symbols are used to transmit control information in one slot, orthogonal codes (w0, w1, w2, w3) having a length of 4 may be used in each slot. SF indicates the spreading degree of control information and may be associated with UE multiplexing order or antenna multiplexing order. The SF may vary between 1, 2, 3, 4, . . . , according to system requirements. The SF may be pre-defined between the BS and the UE or may be signaled to the UE through DCI or RRC signaling. For example, when one of the SC-FDMA symbols for control information is punctured to perform SRS transmission, a spread code with a reduced SF value (for example, e.g., an SF value of 3 rather than an SF value of 4) may be applied to control information of the corresponding slot.

The signal generated through the above-mentioned procedure may be mapped to subcarriers in the PRB and may then be converted into a time domain signal through an IFFT module. A CP is added to the time domain signal and the generated SC-FDMA symbol is transmitted through an RF unit.

Each procedure is described below in more detail on the assumption that ACK/NACK information for 5 DL CCs is transmitted. When each DL CC can transmit two PDSCHs, a corresponding ACK/NACK may be 12 bits provided that a DTX state is included. Assuming that QPSK modulation and time spreading of SF=4 are applied, the coding block size (after rate matching) may be 48 bits. The coded bits are modulated into 24 QPSK symbols and 12 QPSK symbols are distributed to each slot. In each slot, 12 QPSK symbols are converted into 12 DFT symbols through a 12-point DFT operation. 12 DFT symbols of each slot are spread and mapped to four SC-FDMA symbols using the spread code of SF=4 in the time domain. Since 12 bits are transmitted through 2 bits×12 subcarriers×8 SC-FDMA symbols, the coding rate is 0.0625 (=12/192). In the case of SF=4, up to four UEs may be multiplexed to one PRB.

Figure 30:
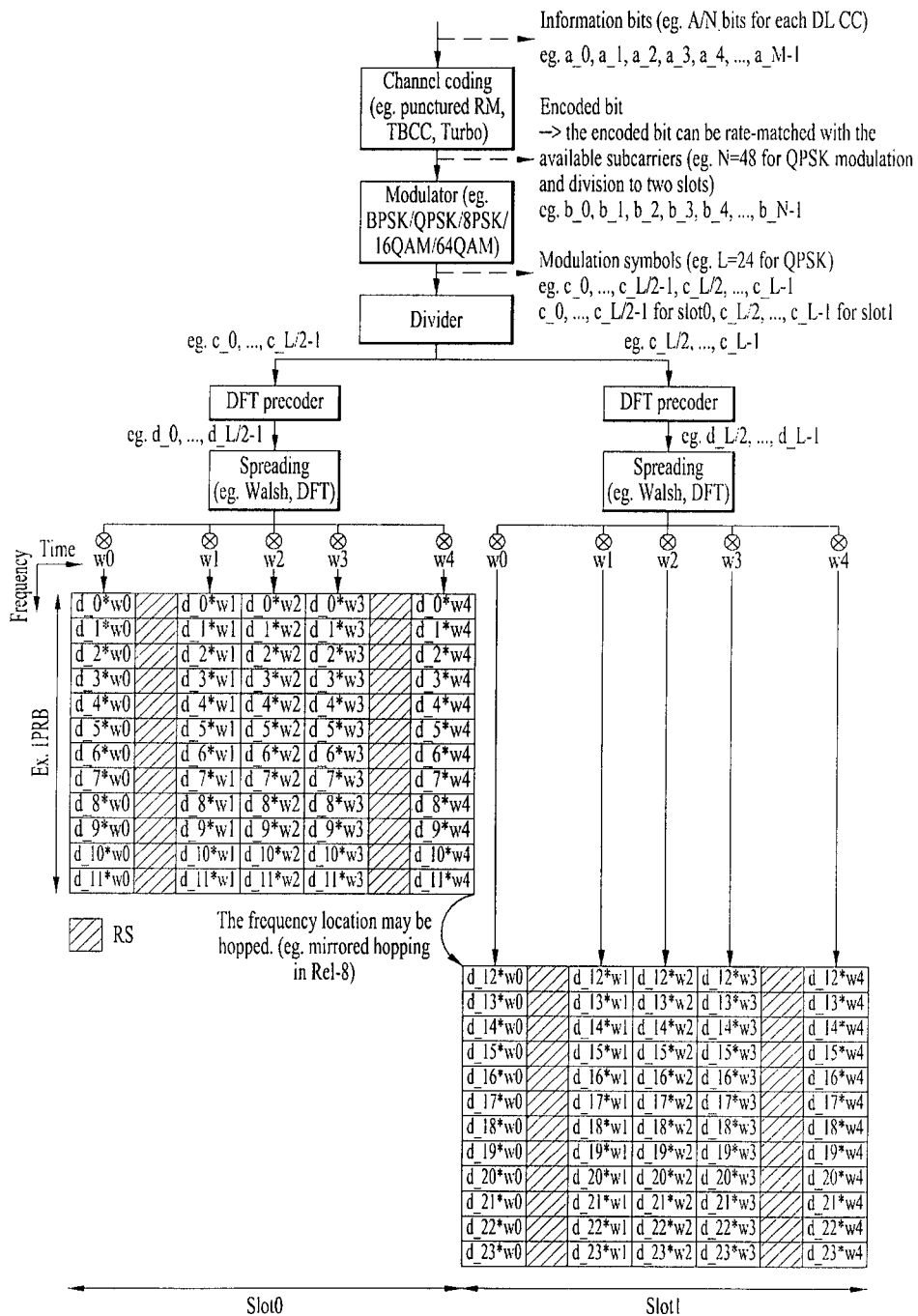

FIG. 30 illustrates a PUCCH format 3 structure that uses the orthogonal code (OC) of SF=5.

The basic signal processing procedure of FIG. 30 is identical to that of FIG. 29. However, the number/position of UCI SC-FDMA symbols and the number/position of RS SC-FDMA symbols shown in FIG. 30 are different from those of FIG. 29. In this case, the spreading block may be provided upstream of the DFT precoder.

The structure of FIG. 30 may employ the RS structure of the LTE system. For example, cyclic shift (CS) may be applied to a basic sequence. The multiplexing capacity of the data part is 5 due to an SF value of 5 (SF=5). However, the multiplexing capacity of the RS part is determined according to a cyclic shift (CS) interval ($\Delta_{shift}^{PUCCH}$). For ft PUCCH example, the multiplexing capacity is given as $12/\Delta_{shift}^{PUCCH}$. In this case, the multiplexing capacity is 12, 6, and 4 when $\Delta_{shift}^{PUCCH}=1$, $\Delta_{shift}^{PUCCH}=2$, and $\Delta_{shift}^{PUCCH}=3$, respectively. In FIG. 30, while the multiplexing capacity of the data part is 5 due to the SF value of 5, the multiplexing capacity of the RS part is 4 when $\Delta_{shift}^{PUCCH}=3$ and therefore the entire multiplexing capacity may be limited to 4 which is the smaller of two capacity values 5 and 4.

Figure 31:
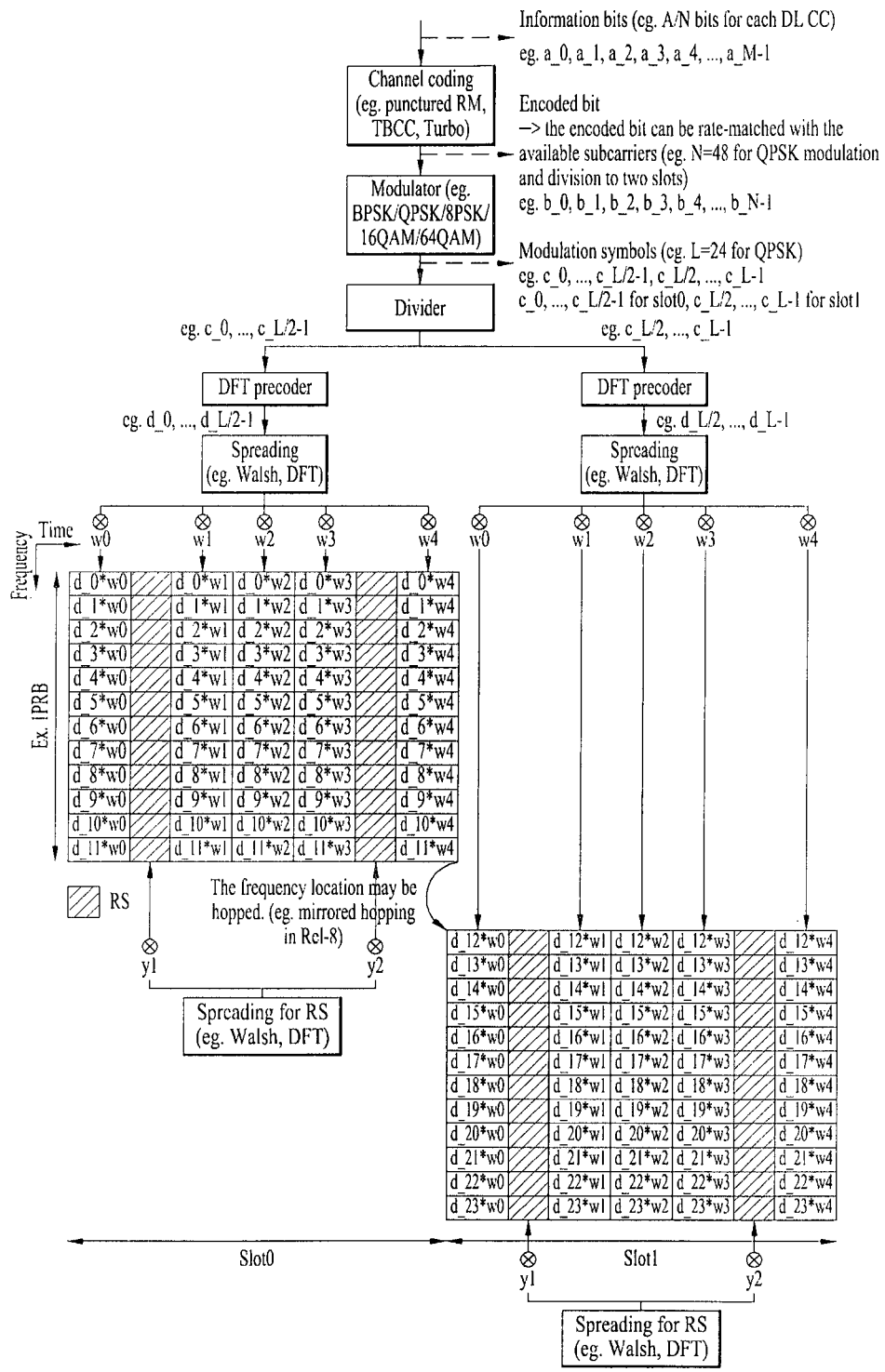

FIG. 31 illustrates the PUCCH format 3 structure which can increase the multiplexing capacity at a slot level.

The entire multiplexing capacity may be increased by applying SC-FDMA symbol level spreading illustrated in FIGS. 29 and 30 to the RS. As shown in FIG. 31, the multiplexing capacity is doubled if a Walsh cover (or DFT code cover) is applied within the slot. Therefore, even when $\Delta_{shift}^{PUCCH}=3$, the multiplexing capacity is 8 such that the multiplexing capacity of the data section is not reduced. In FIG. 31, [y1 y2]=[1 1] or [y1 y2]=[1 −1] or a linearly-transformed format thereof (for example, [j j], [j −j], [1 j], or [1 −j]) may also be used as an orthogonal cover (OC) code for the RS.

Figure 32:
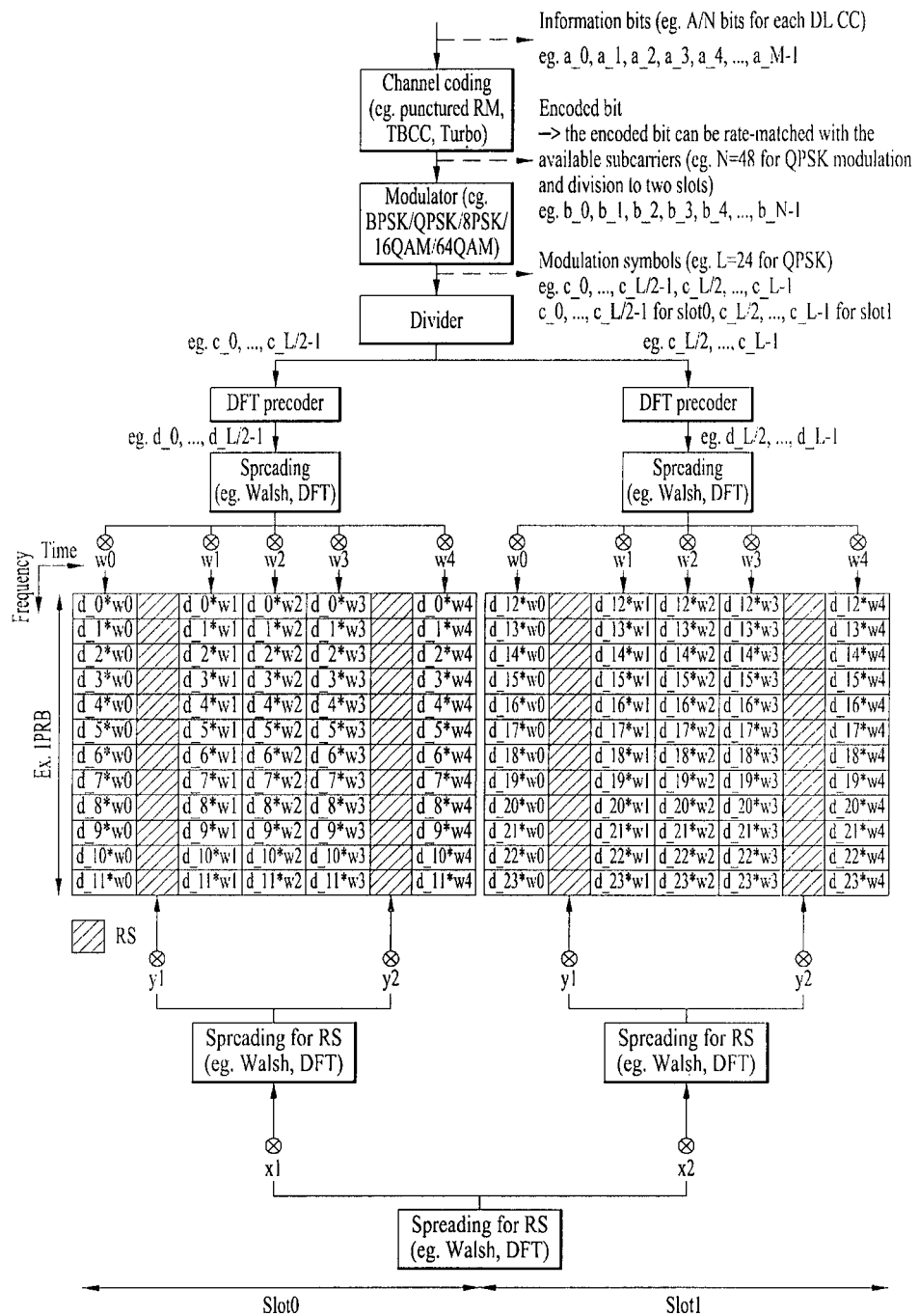

FIG. 32 illustrates a PUCCH format 3 structure which can increase the multiplexing capacity at a subframe level.

If frequency hopping is not applied at the slot level, the multiplexing capacity may again be doubled by applying a Walsh cover on a slot basis. Here, as previously stated above, [x1 x2]=[1 1] or [1 −1] may be used as the orthogonal cover code and a modified format thereof may also be used as described above.

For reference, the order of the PUCCH format 3 processing processes is not limited to those shown in FIGS. 29 to 32.

FIG. 33 illustrates an ACK/NACK information transmission structure based on channel selection to which the present invention is applied. As shown in FIG. 33, two PUCCH resources (PUCCH resources #0 and #1) or two PUCCH channels (PUCCH channels #0 and #1) may be established for the PUCCH format 1b for 2-bit ACK/NACK information.

When 3-bit ACK/NACK information is transmitted, 2 bits of the 3-bit ACK/NACK information may be expressed through the PUCCH format 1b and the one remaining bit may be expressed through a PUCCH resource which is selected from the two PUCCH resources. For example, 1 bit (two cases) can be expressed by selecting one of the case of transmission of ACK/NACK information using the PUCCH resource #0 and the case of transmission of ACK/NACK information using the PUCCH resource #1 and therefore a total of 3 ACK/NACK information bits can be expressed.

Table 12 illustrates exemplary transmission of 3-bit ACK/NACK information using channel selection. Here, it is assumed that two PUCCH resources are established.

TABLE 12

| ACK/NACK | Ch1 | | Ch2 | |
| --- | --- | --- | --- | --- |
| | RS | Data | RS | Data |
| N, N, N | 1 | 1 | 0 | 0 |
| N, N, A | 1 | −j | 0 | 0 |
| N, A, N | 1 | j | 0 | 0 |
| N, A, A | 1 | −1 | 0 | 0 |
| A, N, N | 0 | 0 | 1 | 1 |
| A, N, A | 0 | 0 | 1 | −j |
| A, A, N | 0 | 0 | 1 | j |
| A, A, A | 0 | 0 | 1 | −1 |

In Table 12, 'A' represents ACK information, and 'N' represents NACK information or NACK/DTX information. '1, −1, j, −j' represents four QPSK-modulated complex modulation symbols obtained when 2-bit transmission information 'b(0),b(1)' transmitted in a PUCCH format is QPSK-modulated. 'b(0),b(1)' correspond to binary transmission bits transmitted using the selected PUCCH resources. For example, according to Table 13, the binary transmission bits b(0),b(1) may be mapped to a complex modulation symbol and may then be transmitted through a PUCCH resource.

TABLE 13

| Modulation | Binary transmission bits b(0), b(1) | Complex modulation symbol |
| --- | --- | --- |
| QPSK | 0, 0 | 1 |
| | 0, 1 | −j |
| | 1, 0 | j |
| | 1, 1 | −1 |

FIG. 34 illustrates an ACK/NACK information transmission structure using enhanced channel selection to which the present invention is applied. Although PUCCH #0 and PUCCH #0 are shown in different time/frequency domains in FIG. 34 for ease of explanation, the structure may also be configured such that different codes are used in the same time/frequency domain. As shown in FIG. 34, two PUCCH resources (PUCCH resource #0 and #1) may be established for PUCCH format 1a for 1-bit ACK/NACK transmission.

When 3-bit ACK/NACK information is transmitted, one bit of the 3-bit ACK/NACK information may be represented through the PUCCH format 1a, another bit may be represented through a PUCCH resource, through which ACK/NACK transmission is performed from among the PUCCH resources (PUCCH resource #0 and #1), and the last bit may be represented differently depending on which resource is associated with a transmitted reference signal (RS). Here, although it is preferable that the RS be transmitted in the time/frequency regions of the first selected PUCCH resources (PUCCH resource #0 and #1), the RS may also be transmitted in the time/frequency regions of the original PUCCH resource.

That is, 2 bits (four cases) can be expressed by selecting one of the case in which ACK/NACK information is transmitted through the PUCCH resource #0 and an RS associated with resources corresponding to the PUCCH resource #0 is transmitted, the case in which ACK/NACK information is transmitted through the PUCCH resource #1 and an RS associated with resources corresponding to the PUCCH resource #1 is transmitted, the case in which ACK/NACK information is transmitted through the PUCCH resource #0 and an RS associated with resources corresponding to the PUCCH resource #1 is transmitted, and the case in which ACK/NACK information is transmitted through the PUCCH resource #1 and an RS associated with resources corresponding to the PUCCH resource #0 is transmitted and therefore a total of 3 ACK/NACK information bits can be expressed.

Table 14 illustrates exemplary transmission of 3-bit ACK/NACK information using the enhanced channel selection. Here, it is assumed that two PUCCH resources are established.

TABLE 14

| ACK/NACK | Ch1 | | Ch2 | |
| --- | --- | --- | --- | --- |
| | RS | Data | RS | Data |
| N, N, N | 1 | 1 | 0 | 0 |
| N, N, A | 1 | −1 | 0 | 0 |
| N, A, N | 0 | 1 | 1 | 0 |
| N, A, A | 0 | −1 | 1 | 0 |
| A, N, N | 1 | 0 | 0 | 1 |
| A, N, A | 1 | 0 | 0 | −1 |
| A, A, N | 0 | 0 | 1 | 1 |
| A, A, A | 0 | 0 | 1 | −1 |

Compared to the example of Table 13 which uses channel selection, the example of Table 14 which uses enhanced channel selection is characterized in that a symbol mapped to a PUCCH resource can be implemented through BPSK modulation. However, unlike the example of Table 14, a complex symbol may also be implemented through PPSK modulation using PUCCH format 1b. In this case, the number of bits which can be transmitted through the same PUCCH resource may be increased.

Although FIGS. 33 and 34 illustrate an example in which 2 PUCCH resources are established to transmit 3-bit ACK/NACK information, the number of transmission bits of ACK/NACK information and the number of PUCCH resources may be set in various ways and it will be apparent that the same principle can be applied when uplink control information other than ACK/NACK information is transmitted or when ACK/NACK information and other uplink control information are simultaneously transmitted.

Table 15 illustrates an example in which two PUCCH resources are established and 6 ACK/NACK states are transmitted using channel selection.

TABLE 15

| HARQ-ACK(0), HARQ-ACK(1) | $n^{(1)}_{PUCCH}$ | b(0), b(1) |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

Table 16 illustrates an example in which three PUCCH resources are established and 11 ACK/NACK states are transmitted using channel selection.

TABLE 16

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

Table 17 illustrates that four PUCCH resources are established and 20 ACK/NACK states are transmitted using channel selection.

TABLE 17

| HARQ-ACK(0), HARQ-ACK(1), HARQ-ACK(2), HARQ-ACK(3) | $n^{(1)}_{PUCCH}$ | b(0), b(1) |
|---|---|---|
| ACK, ACK, ACK, ACK | $n^{(1)}_{PUCCH,1}$ | 1, 1 |
| ACK, ACK. ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

When communication is performed in a CA environment, intra-band CA is first taken into consideration. Here, the term "band" in "intra-band" and "inter-band" refers to an operating band.

The term "operating band" refers to a frequency range in which E-UTRA operates in a paired or unpaired manner and which is defined with a specific set of technical requirements.

The operating band used in LTE may be expressed as shown in the following Table 18.

TABLE 18

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |

TABLE 18-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |

Note
[1]Band 6 is not applicable.

Intra-band CA indicates that a plurality of DL and/or UL component carriers is located adjacent to each other in the frequency domain.

That is, intra-band CA may indicate that carrier frequencies of DL and/or UL components are located in the same (operating) band.

Accordingly, through intra-band CA, a number of component carriers may be designed on the assumption that the component carriers have similar propagation characteristics.

Here, the term "propagation characteristics" collectively describes various characteristics such as propagation/path delay, propagation/path loss, and fading channel impact that may vary depending on frequency (or center frequency).

The UE determines uplink transmission timing for a primary cell UL CC. The UE then applies the same uplink transmission timing of the secondary cell as the uplink transmission timing of the primary cell on the same assumption as described above (for example, on the assumption of similar propagation/path delay between CCs).

Here, the transmission timing of a physical random access channel (PRACH) may differ from such timing.

UL subframe boundaries of cells at the UE are aligned through the above procedure. In this case, the UE may perform communication using only one radio frequency (RF) unit in a CA environment.

However, in a CA environment, one or more cells may not be adjacent to other cells in the frequency domain due to problems associated with frequency allocation to a mobile communication provider such as allocation of remaining frequencies and reuse of frequencies that have been previously used for other purposes.

For example, when there are 2 cells which implement a CA environment, the carrier frequency of one of the 2 cells may be 800 MHz (UL/DL) and the carrier frequency of the other cell may be 2.5 GHz (UL/DL).

In another example, the carrier frequency of one of the 2 cells may be 800 MHz (UL/DL) and the carrier frequency of the other cell may be 2.6 GHz (UL/DL).

In another example, the carrier frequency of one of the 2 cells may be 700 MHz (UL/DL) and the carrier frequency of the other cell may be 1.7(UL)/2.1(DL) GHz (TDD). Here, the carrier frequencies may be frequencies of DL CCs or UL CCs.

An environment, in which carrier frequencies are spaced apart from each other in the frequency domain as described above, may be referred to as an inter-band CA. That is, inter-band CA may indicate that carrier frequencies of DL and/or UL component carriers are located in different bands.

The assumption that propagation characteristics of cells are similar is no longer maintained in such an inter-band CA environment.

Therefore, in the inter-band CA environment, it is not possible to assume that (UL) subframe boundaries of cells are aligned.

Accordingly, there is a need to apply different uplink transmission timings to cells. In this case, the UE may use a plurality of RF units in order to perform communication in the CA environment.

On the other hand, the detection time of a PDSCH or PDCCH indicating DL SPS release corresponding to a transmission time (nth subframe) of a PUCCH may be defined as shown in the following Table 19 from TS 36.213 v10.1.0.

TABLE 19

(FDD) PDSCH or PDCCH indicating DL SPS release in subframe$^{n-4}$ → PUCCH in subframe$^n$
(TDD) PDSCH or PDCCH indicating DL SPS release in subframe$^{n-k}$ → PUCCH in subframe$^n$ "DAI" in UL-DL configurations 1-6 may indicate the accumulative number of PDCCH(s) allocated to a PDCCH and PDSCH transmission(s) indicating downlink SPS release for DCI format 1/1A/1B/1D/2/2A/2B/2C.

A downlink associated with a set index K $\{k_0, k_1, \ldots K_{M-1}\}$ applied to TDD may be expressed as shown in the following Table 20.

TABLE 20

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 35:
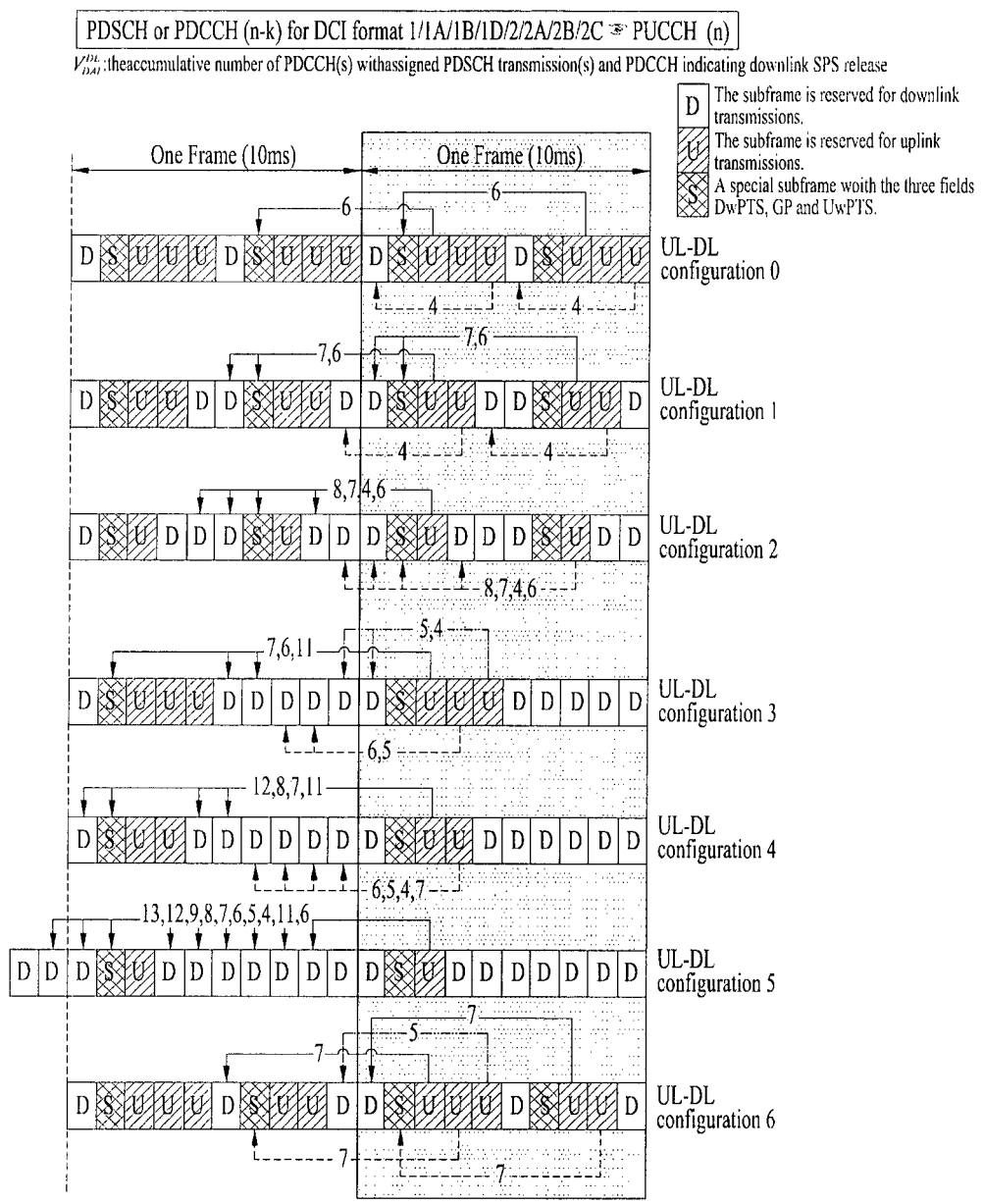
FIG. 35 illustrates an exemplary PDSCH or PDCCH (n−k) for DCI format 1/1A/1B/1D/2/2A/2B/2C.

In this case, PDSCH or PDCCH (n−k) for DCI format 1/1A/1B/1D/2/2A/2B/2C may be expressed as shown in FIG. 35.

On the other hand, the detection time of DCI format 0/4 (0 or 4) corresponding to a transmission time (nth subframe) of a PUCCH may be defined as shown in the following Table 21 from TS 36.213 v10.1.0.

TABLE 21

(TDD) DCI format 0/4 in subframe$^{n-k}$ → PUSCH in subframe$^n$

Here, DAI, $V_{DAI}^{UL}$ (UL-DL configurations 1-6), indicates the number of subframes of a PDCCH and PDSCH transmissions indicating downlink SPS release in all subframes n−k for DCI format 0/4.

An uplink associated with index K for TDD may be expressed as shown in the following Table 22.

TABLE 22

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

Figure 36:
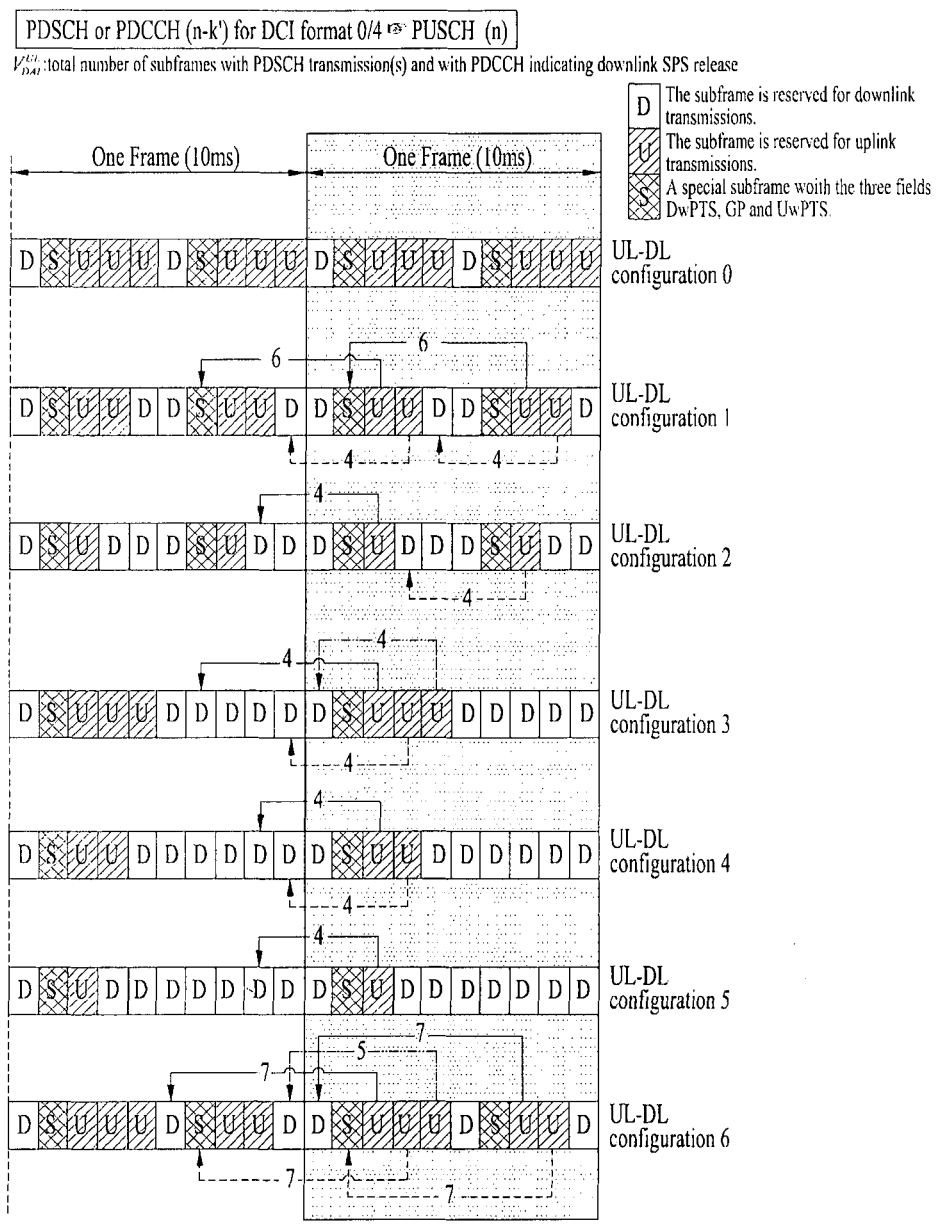
FIG. 36 illustrates an exemplary PDCCH (n−k) for DCI format 0/4.

In this case, PDCCH (n−k) for DCI format 0/4 may be expressed as shown in FIG. 36.

On the other hand, the transmission time of a PUSCH corresponding to the detection time (nth subframe) of a PDCCH or PHICH may be defined as shown in the following Table 23 from TS 36.213 v10.1.0.

TABLE 23

(FDD & normal HARQ operation) PDCCH with DCI format 0/4 and/or a PHICH transmission in subframe n → PUSCH in subframe n + 4
(FDD & subframe bundling operation) PDCCH with DCI format 0 in subframe n and/or a PHICH transmission in subframe n − 5 → first PUSCH in subframe n + 4
(TDD & normal HARQ operation & UL/DL configuration 1-6) PDCCH with DCI format and/or a PHICH transmission in subframe n → PUSCH in subframe n + k
(TDD & normal HARQ operation & UL/DL configuration 0) PDCCH with DCI format and/or a PHICH transmission in subframe n →
    If the MSB of the UL index in the PDCCH with uplink DCI format is set to 1 or PHICH is received in subframe n = 0 or 5 in the resource corresponding to $I_{PHICH} = 0$, → PUSCH in subframe n + k
    If the LSB of the UL index in the DCI format 0/4 is set to 1 in subframe n or a PHICH is received in subframe n = 0 or 5 in the resource corresponding to $I_{PHICH} = 1$ or PHICH is received in subframe n = 1 or 6, → PUSCH in subframe n + 7
    If both the MSB and LSB of the UL index in the PDCCH with uplink DCI format are set in subframe n, → PUSCH in subframe n + k and n + 7
(TDD & subframe bundling operation & UL/DL configuration 1-6) PDCCH with DCI format 0 in subframe n and/or a PHICH transmission in subframe n − 1 → first PUSCH in subframe n + k
(TDD & subframe bundling operation & UL/DL configuration 0) PDCCH with DCI format 0 in subframe n and/or a PHICH transmission in subframe n − 1 →
    If the MSB of the UL index in the DCI format 0 is set to 1 or if $I_{PHICH} = 0$ → first PUSCH in subframe n + k
    If, for TDD UL/DL configuration 0 and subframe bundling operation, the LSB of the UL index in the PDCCH with DCI format 0 is set to 1 in subframe n or if $I_{PHICH} = 1$ → PUSCH in subframe n + 7

Here, k for TDD configuration 0-6 may be expressed as shown in the following Table 24.

TABLE 24

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

In addition, k for TDD configurations 0, 1, and 6 may be expressed as shown in the following Table 25.

TABLE 25

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 9 | 6 | | | | 9 | 6 | | | |
| 1 | | | 2 | | 3 | | | 2 | | 3 |
| 6 | | 5 | 5 | | | | 6 | 6 | | 8 |

Figure 37:
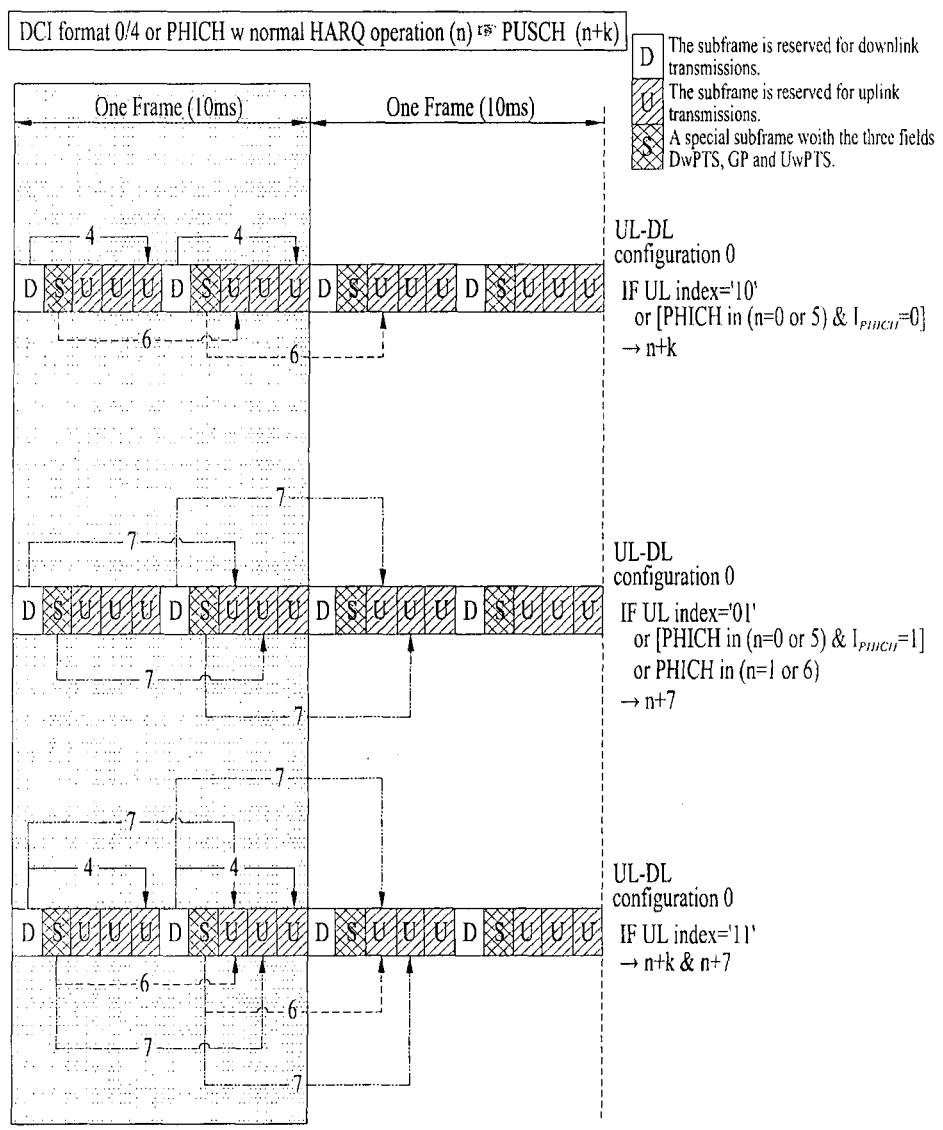
FIG. 37 illustrates an exemplary PHICH or DCI format 0/4 in a general HARQ operation.

A PHICH or DCI format 0/4 in a general HARQ operation may be expressed as shown in FIG. 37.

Figure 38:
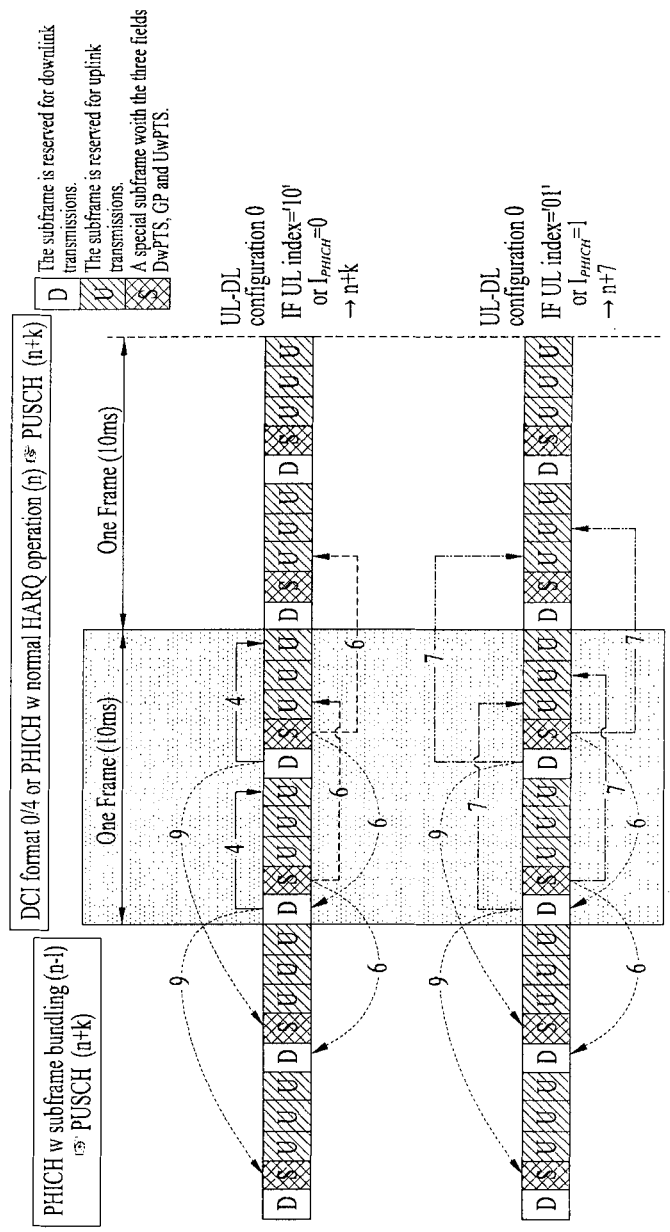
FIG. 38 illustrates an exemplary DCI format 0/4 having subframes that have been bundled in a PHICH to which bundling (n−l) is applied.

DCI format 0/4 having subframes that have been bundled in a PHICH to which bundling (n−l) is applied in the example of FIG. 37 may be expressed as shown in FIG. 38.

Figure 39:
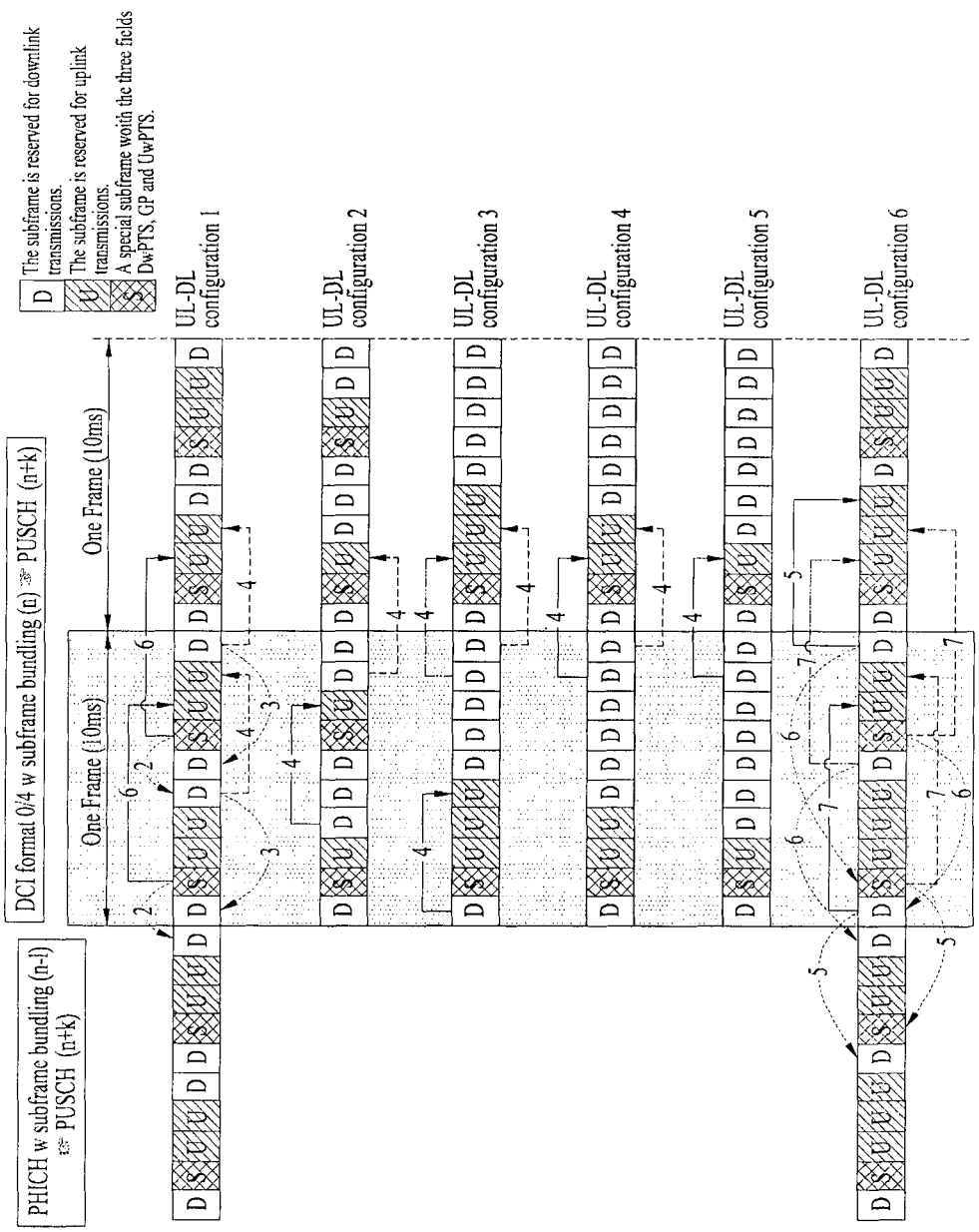
FIG. 39 illustrates an exemplary PHICH or DCI format 0/4 having subframes that have bundled in a PHICH to which bundling (n−l) is applied.

In addition, a PHICH or DCI format 0/4 having subframes that have been bundled in a PHICH to which bundling (n−l) is applied in the example of FIG. 37 may be expressed as shown in FIG. 39.

On the other hand, the reception time of a PHICH corresponding to the transmission time (nth subframe) of a PUSCH may be defined as shown in the following Table 26 from TS 36.213 v10.1.0.

TABLE 26

(FDD) PUSCH in subframe n → PHICH in subframe n + 4
(TDD) PUSCH in subframe n → PHICH in subframe n + $k_{PHICH}$ Here, $k_{PHICH}$ for RDD may be expressed as shown in the following Table 27.

TABLE 27

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | | 4 | 7 | 6 | | 4 | 7 | 6 |
| 1 | | | 4 | 6 | | | | 4 | 6 | |
| 2 | | | 6 | | | | 6 | | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Figure 40:
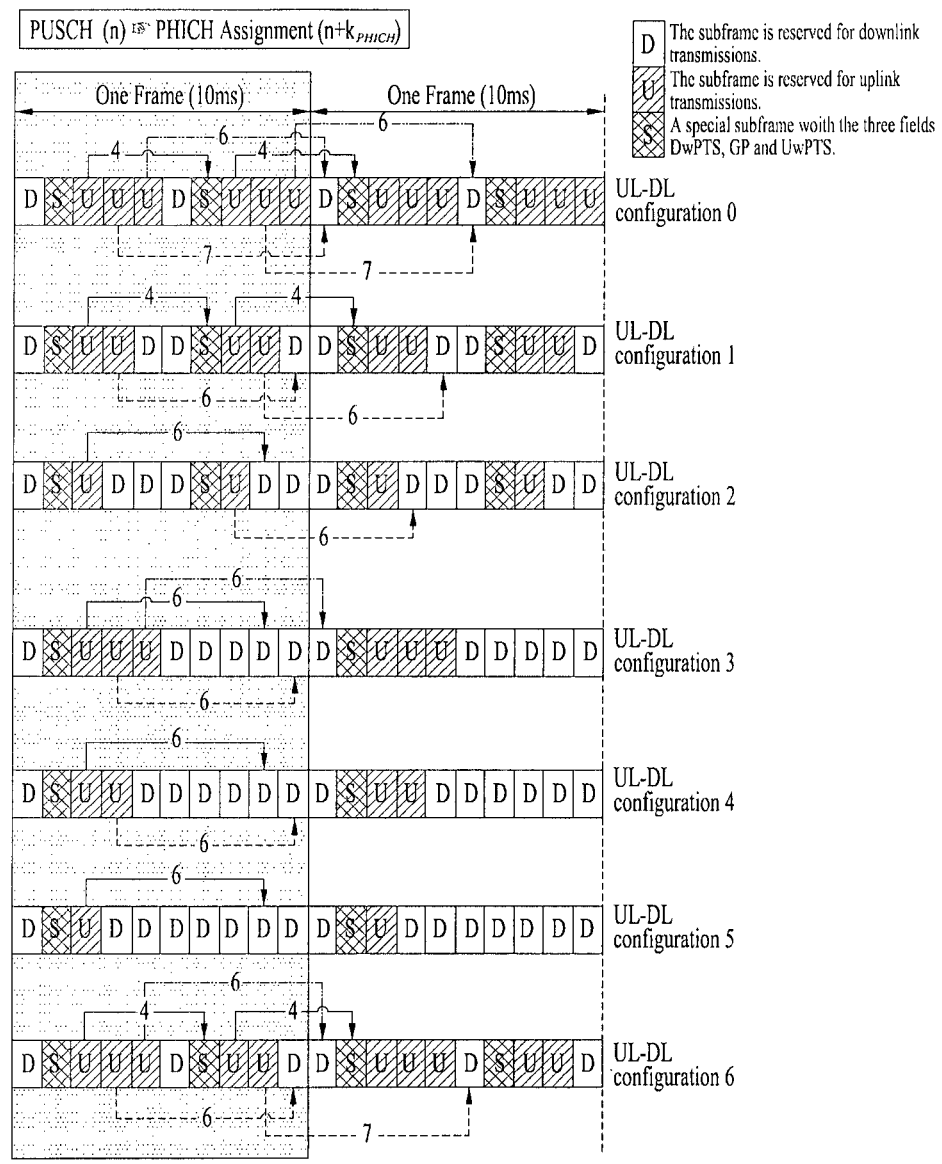
FIG. 40 illustrates an exemplary PHICH and PUSCH(n) allocated to (n+k)

A PHICH and a PUSCH(n) allocated to (n+k) may be expressed as shown in FIG. 40.

On the other hand, the reception time (nth subframe) of a PHICH and the transmission time of a PUSCH corresponding to the response may be defined as shown in the following Table 28 from TS 36.213 v10.1.0.

TABLE 28

(FDD) PUSCH in subframe i − 4 → PHICH in subframe i (TDD & UL/DL configuration 1-6) PUSCH in subframe i − k → PHICH in subframe i (TDD & UL/DL configuration 0) PUSCH in subframe i − k → PHICH in subframe i PUSCH in subframe i − k → If PHICH in the resource corresponding to $I_{PHICH}$ = 0 in subframe i PUSCH in subframe i − 6 → If PHICH in the resource corresponding to $I_{PHICH}$ = 1 in subframe i In addition, k for TDD configuration 0-6 may be expressed as shown in the following Table 29.

TABLE 29

| TDD UL/DL Configuration | subframe number i |
|---|---|
| 0 | |
| 1 | |
| 2 | |
| 3 | |
| 4 | |
| 5 | |
| 6 | |

Figure 41:
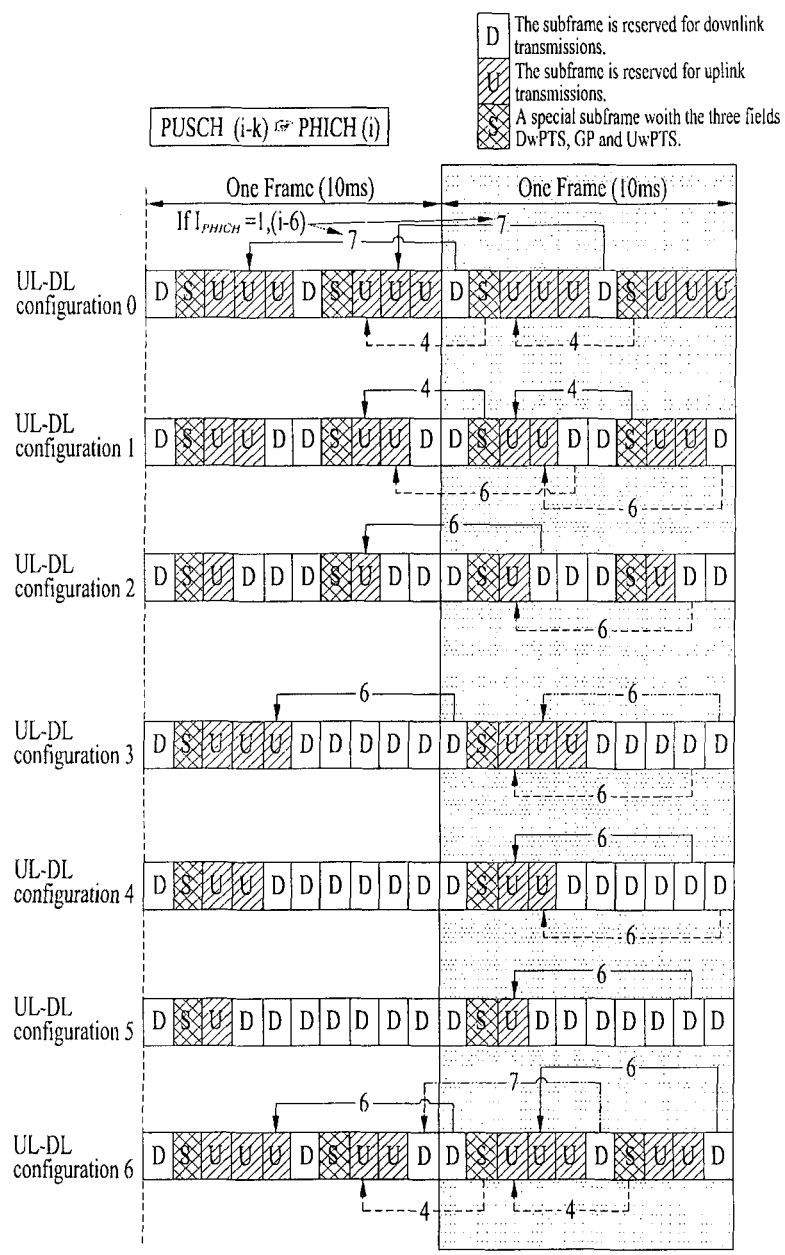
FIG. 41 illustrates exemplary PUSCH (i−k) and PHICH (i)
Figure 42:
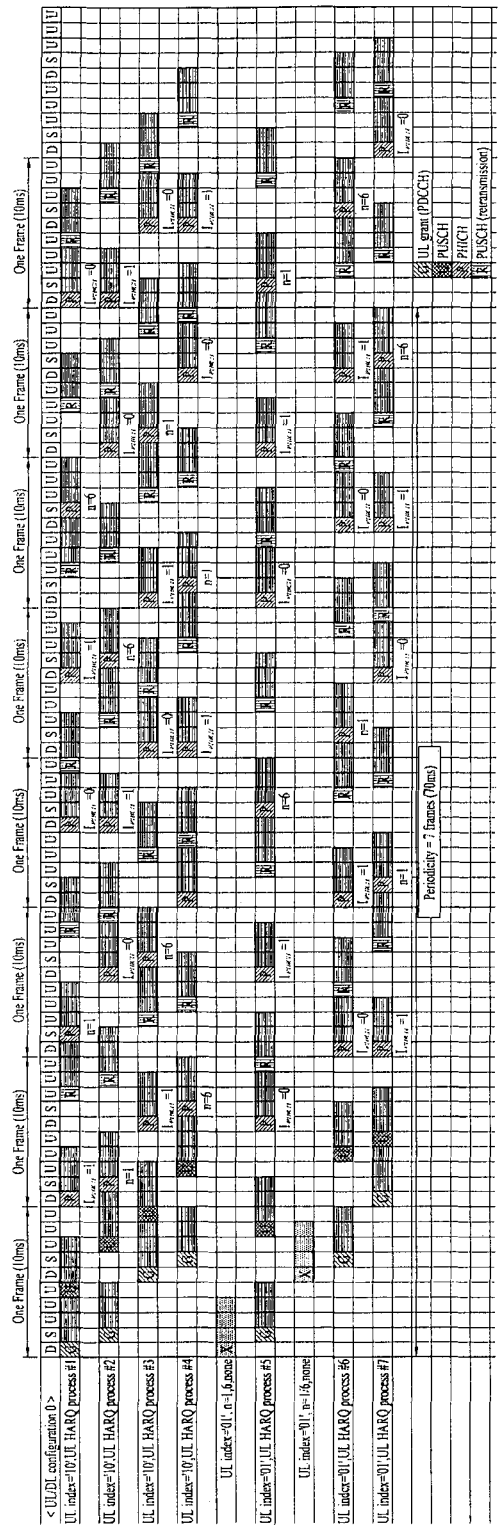
FIG. 42 illustrates an example in which a UL-DL configuration used in a plurality of serving cells is changed according to the period of a HARQ process in association with the present invention.

A relation between PUSCH (i−k) and PHICH (i) may be expressed as shown in FIG. 41.

LTE-A release 10 imposes a restriction that cells should use the same UL-DL configuration in TDD. Here, the UL-DL configuration may have a format as shown in the following Table 30.

TABLE 30

| Uplink-downlink configuration | Ratio (D + S:U) (D:U) | Downlink-to-Uplink Switch-point periodicity | Subframe number | | | | | | | | | |
|---|---|---|---|---|---|---|---|---|---|---|---|---|
| | | | 0 | 1 | 2 | 3 | 4 | 5 | 6 | 7 | 8 | 9 |
| 0 | 4:6 (1:3) | 5 ms | D | S | U | U | U | D | S | U | U | U |
| 1 | 6:4 (2:2) | 5 ms | D | S | U | U | D | D | S | U | U | D |
| 2 | 8:2 (3:1) | 5 ms | D | S | U | D | D | D | S | U | D | D |
| 3 | 7:3 (6:3) | 10 ms | D | S | U | U | U | D | D | D | D | D |
| 4 | 8:2 (7:2) | 10 ms | D | S | U | U | D | D | D | D | D | D |
| 5 | 9:1 (8:1) | 10 ms | D | S | U | D | D | D | D | D | D | D |
| 6 | 5:5 (3:5) | 5 ms | D | S | U | U | U | D | S | U | U | D |

Such a communication environment is designed on the assumption that neighbor base stations (BSs) use the same UL-DL configurations.

However, even when neighbor BSs are time-synchronized in a time-synchronized network, a DL signal of a specific BS may collide with a UL signal transmitted from a specific UE to an adjacent BS if the neighbor BSs use different UL-DL configurations.

That is, when a UE receives a DL signal from BS a at a cell edge while another UE transmits a UL signal to BS b at an adjacent location, interference may occur between the DL signal and the UL signal since the BSs use different UL-DL configurations.

Use of the same UL-DL configurations in adjacent BSs reduces the flexibility of BS resource management.

That is, if BSs are allowed to use different UL-DL configurations based on the volume of traffic or the like, it is possible to achieve more flexible and dynamic resource management.

Accordingly, a primary object of the present invention is to allow a plurality of BSs to use different UL-DL configurations to enable more efficient communication.

For example, if the amount of UL resources needed for UEs belonging to a specific BS is increased while BSs use the same UL-DL configurations, the specific BS converts the UL-DL configurations into UL-DL configurations having a larger number of UL subframes to provide a communication service using greater UL resources.

In another example, if the number of UEs belonging to a specific BS, which need to perform communication, is reduced in a time zone such as dawn having very low communication traffic while BSs use the same UL-DL configurations, the specific BS converts UL-DL configurations into UL-DL configurations having a larger number of UL subframes to reduce unnecessary DL transmission (e.g., synchronization signal transmission, reference signal transmission, broadcast channel transmission, etc.), thereby achieving the effects of BS power saving.

In addition, using the same UL-DL configurations in cells in the CA environment may also reduce the flexibility of BS resource management.

That is, if BSs are allowed to use different UL-DL configurations based on the amount of traffic or the like, it is possible to achieve more flexible and dynamic resource management.

For example, if the amount of UL resources needed for UEs belonging to a specific BS is increased while cells use the same UL-DL configurations, the specific BS converts UL-DL configurations of one or more specific cells into UL-DL configurations having a larger number of UL subframes to allow a communication service to be provided using greater UL resources.

In another example, when the number of UEs belonging to a specific BS, which need to perform communication, is significantly reduced in a time zone such as dawn having very low communication traffic while the cells use the same UL-DL configurations, the specific BS converts UL-DL configurations of one or more specific cells into UL-DL configurations having a larger number of UL subframes to reduce unnecessary DL transmissions (e.g., synchronization signal transmission, reference signal transmission, broadcast channel transmission, etc.), thereby achieving the effects of cell power saving.

Specifically, in an inter-band CA environment, cells may require different uplink transmission timings and a UE may use a plurality of RF units to perform communication in the inter-band CA environment. In such an inter-band CA environment, different UL-DL configurations may be applied to the RF units without causing interference between cells.

Therefore, the present invention provides a method for supporting use of different UL-DL configurations in BSs and/or cells (or CCs or bands) in a CA environment.

In addition, the present invention suggests a method for flexibly adjusting use of different UL-DL configurations in BSs and/or cells (or CCs or bands) in a CA environment.

More specifically, the present invention suggests a switching interval (or timing) of a UL-DL configuration.

Although a method for flexibly adjusting use of different UL-DL configurations in cells (or CCs or bands) in a carrier and/or in BSs according to the present invention is described on the assumption of TDD for ease of explanation, the method may be applied when TDD and FDD are used together. For example, even when FDD is used in a specific cell and TDD is used in another specific cell in a CA environment, the method may be applied to flexibly adjust use of UL-DL configurations in TDD.

The following embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment.

In the following description made in conjunction with the drawings, procedures or steps that may obscure the subject matter of the present invention are not described and procedures or steps that will be apparent to those skilled in the art are also not described The embodiments of the present invention can be supported by standard documents of at least one of the IEEE 802xx system (such as 802.16), the 3rd Generation Partnership Project (3GPP) system, the 3GPP LTE-A system, and the 3GPP2 system which are wireless access systems. Specifically, the embodiments of the present invention can be supported by standard documents such as 3GPP TS 36.211, 3GPP TS 36.212, 3GPP TS 36.213, 3GPP TS 36.321, and 3GPP TS 36.331.

That is, obvious steps or portions that are not described in the embodiments of the present invention can be explained with reference to the standard documents. For all terms used in this disclosure, reference can be made to the standard documents.

There is a need to define a reference unit in order to support dynamic change of UL-DL configurations.

If dynamic change is supported on a subframe basis, all UEs in a cell need to change UL-DL configurations starting from a specific subframe.

Here, there may be a problem associated with the timing of downlink and uplink HARQ ACK/NACK or the like (for example, an ACK/NACK response for a PDCCH in an nth subframe is performed through a PUCCH of an n+kth subframe).

Accordingly, when a specific UE receives an instruction to change UL-DL configurations from a physical layer, a Medium Access Control (MAC) layer, or a Radio Resource Control (RRC) layer, the UE needs to perform a procedure for changing UL-DL configurations.

First Embodiment

A HARQ process should not be affected by change of UL-DL configurations.

For example, in the case of FDD, an ACK/NACK response for transmission of a PUSCH from a UE in an nth subframe is transmitted by a BS in an n+4th subframe. Such a HARQ process operation should not be affected by such change in the UL-DL configurations.

To accomplish this, it is preferable that change of UL-DL configurations be supported based on the period of the HARQ process or a multiple of the period of the HARQ process. A period of UL ACK/NACK feedback is described below in detail.

In FDD, up to 8 UL HARQ processes are supported per cell. The maximum number of UL HARQ processes per cell in TDD may be expressed as shown in the following Table 31 according to UL-DL configurations.

TABLE 31

| TDD UL/DL configuration | Number of HARQ processes for normal HARQ operation | Number of HARQ processes for subframe bundling operation |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

In FDD, if a UL grant (through a PDCCH) is received in an nth subframe, a PUSCH is transmitted in an n+4th subframe and an ACK/NACK response for transmission of the PUSCH in the n+4th subframe is received in an (n+4)+4th subframe through a PHICH. That is, a HARQ process is performed over 8 subframes (8 ms).

Accordingly, the present invention suggests a setting method for supporting change of UL-DL configurations based on the period (8 ms) of the HARQ process or a multiple of the period of the HARQ process so as not to affect the HARQ process when change from FDD to TDD is supported.

FIGS. 42 to 48 illustrate HARQ taking into consideration the maximum number of processes in TDD with the timing relationship between PDCCHs, PUSCHs, and PHICHs in LTE-A.

'G' in FIGS. 42 to 48 represents a subframe in which a UL grant is transmitted from a BS (through a PDCCH) and 'U' represents a subframe in which a PUSCH allocated by the UL grant is transmitted from the UE. 'p' represents a subframe in which an ACK/NACK response for the PUSCH is transmitted from the BS through a PHICH. 'R' represents a subframe in which a PUSCH is retransmitted in response to the PHICH assuming that the PHICH is a NACK. It is also shown in the drawings that retransmissions continue to be performed assuming that the PHICH is a NACK. Here, 'U' and 'R' indicate transmission of a PUSCH from a specific UE and only one PUSCH transmission should be present in the same subframe. That is, in order to maintain single carrier properties of SC-FDMA, a UE is not allowed to transmit a plurality of PUSCHs in one cell at a specific time.

A time period, in which PDCCHs (Gs) and PHICHs (Ps) occupy the same subframe positions in all HARQ processes of FIGS. 42 to 48, may be defined as a HARQ process.

Figure 43:
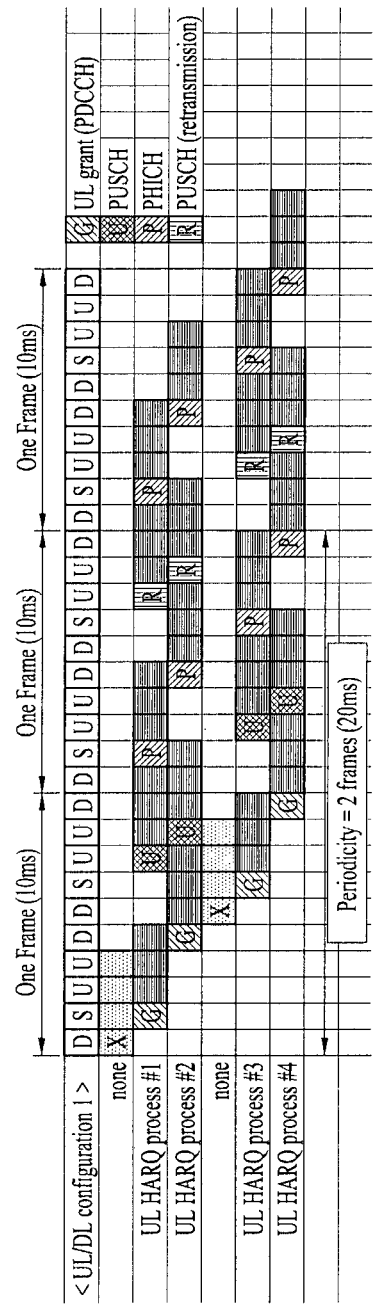
FIG. 43 illustrates another example in which a UL-DL configuration used in a plurality of serving cells is changed according to the period of a HARQ process in association with the present invention.
Figure 44:
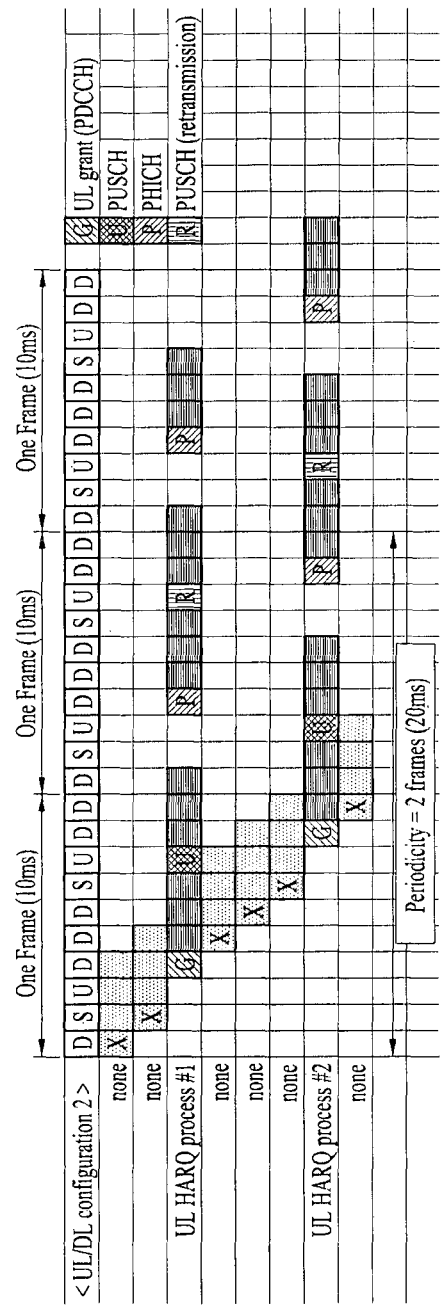
FIG. 44 illustrates another example in which a UL-DL configuration used in a plurality of serving cells is changed according to the period of a HARQ process in association with the present invention.
Figure 45:
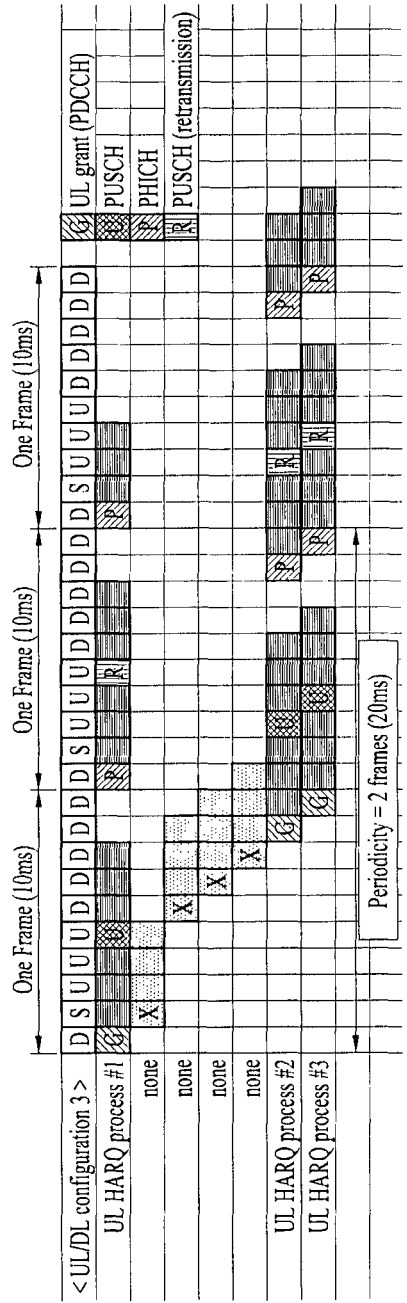
FIG. 45 illustrates another example in which a UL-DL configuration used in a plurality of serving cells is changed according to the period of a HARQ process in association with the present invention.
Figure 46:
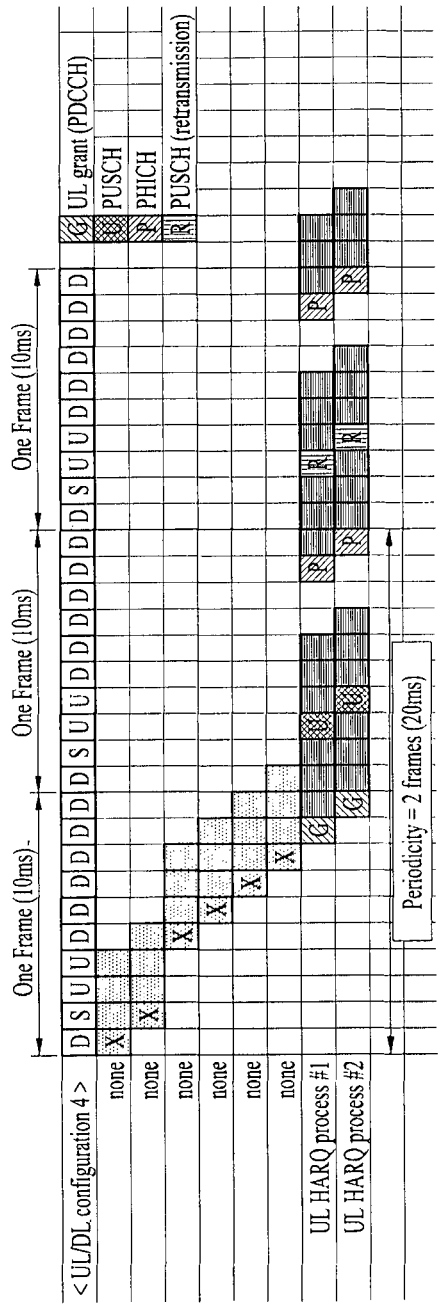
FIG. 46 illustrates another example in which a UL-DL configuration used in a plurality of serving cells is changed according to the period of a HARQ process in association with the present invention.
Figure 47:
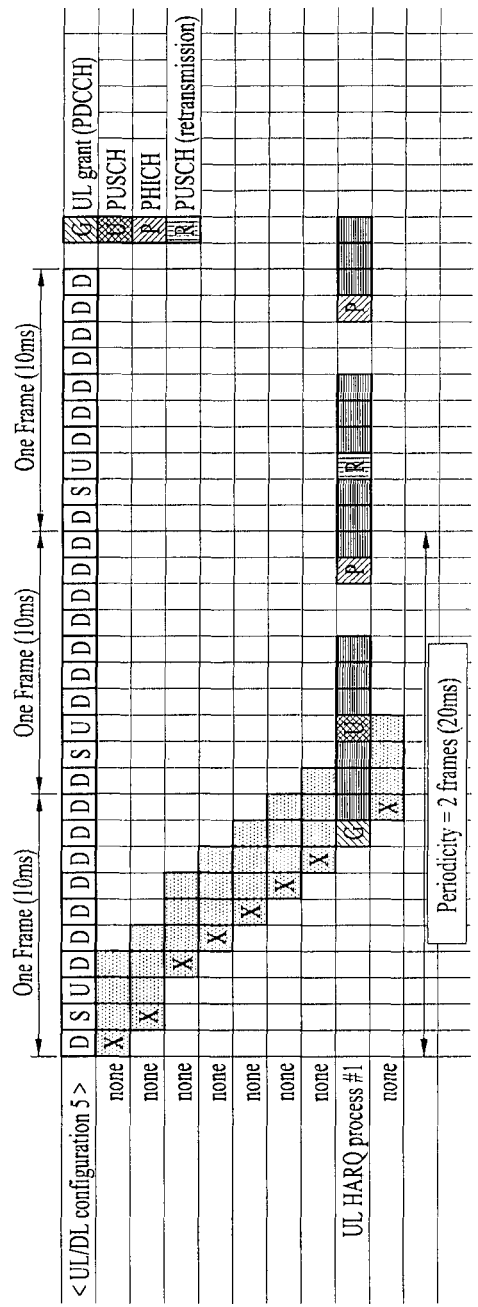
FIG. 47 illustrates another example in which a UL-DL configuration used in a plurality of serving cells is changed according to the period of a HARQ process in association with the present invention.
Figure 48:
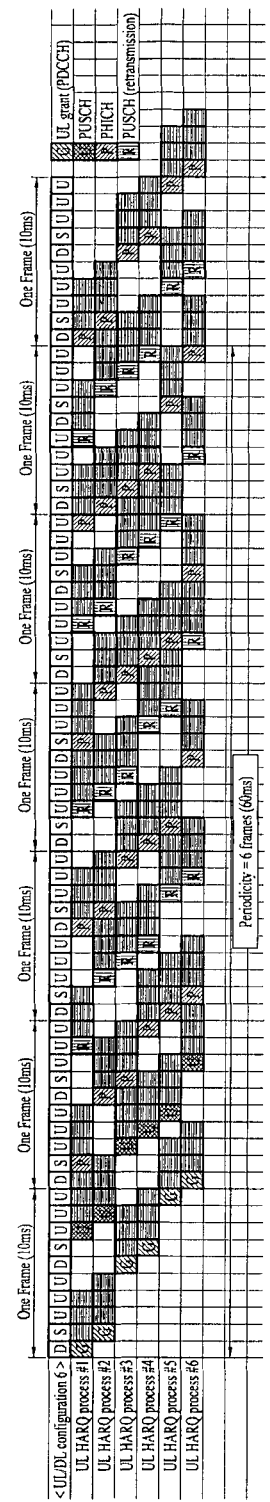
FIG. 48 illustrates another example in which a UL-DL configuration used in a plurality of serving cells is changed according to the period of a HARQ process in association with the present invention.

For example, in UL-DL configuration 1 shown in FIG. 43, 4 Gs in the 1st frame and 4 Ps in the 2nd frame are repeated at the same time positions in HARQ processes. Accordingly, in this case, a HARQ process may be determined to be (about) 20 ms.

In addition, a time period, in which PUSCHs (Us and Rs) occupy the same subframe positions in all HARQ processes of FIGS. 42 to 48, may be defined as a HARQ process.

For example, in the UL-DL configuration 1 shown in FIG. 43, 4 adjacent Us in the 1st and 2nd frames and 4 adjacent Rs in the 2nd and 3rd frames are repeated at the same time positions in HARQ processes. Accordingly, in this case, a HARQ process may be determined to be (about) 20 ms.

The HARQ process derived from the examples of FIGS. 42 to 48 in this manner is 70 ms in the TDD UL-DL configuration 0, 20 ms in the TDD UL-DL configurations 1 to 5, and 60 ms in the TDD UL-DL configuration 6.

Accordingly, it is preferable that UL-DL configuration change be supported based on the period of the HARQ process or a multiple of the period according to each UL-DL configuration so as not to affect the HARQ process.

Second Embodiment

Change of UL-DL configurations should not affect paging channel (PCH) transmission and reception. Paging messages are transmitted using DL-SCH(Downlink Shared Channel), with a corresponding PDCCH masked by a Paging-Radio Network Temporary Identifier (P-RNTI). In the case of FDD deployment and idle mode operation, the position(s) within a radio frame for paging occasions are either {9}, or {4, 9}, or {0, 4, 5, 9}.

Accordingly, the present invention suggests a method for supporting UL-DL configuration change based on a period of 10 ms (or a frame period) (at least in FDD) or a multiple of the period so as not to affect PCH.

Third Embodiment

UL-DL configuration change should not affect Almost Blank Subframe (ABSs) operations of BSs. That is, ABS operations are performed based on an 'ABS pattern info' parameter that is transmitted between BSs. Setting and operation of ABS between BSs and cells should not be affected by UL-DL configuration change.

When UL-DL configurations of BSs or cells are different, a DL of a specific cell and a UL of the specific cell may be constructed together causing interference. There may be a need to efficiently perform ABS operations in order to prevent such interference.

Accordingly, it is desirable that UL-DL configurations be allowed to be changed in order to efficiently support ABS operations.

The present invention suggests a method for setting UL-DL configuration change based on the periodicity (or period) of an ABS pattern or a multiple of the period.

That is, it is preferable that the period be set to 40 ms in FDD, 70 ms in the TDD UL-DL configuration 0, 20 ms in the TDD UL-DL configurations 1 to 5, and 60 ms in the TDD UL-DL configuration 6. It is also preferable that UL-DL configuration change be aligned with ABS pattern change.

Fourth Embodiment

UL-DL configuration change should not affect measurement. That is, when sets of subframes $C_{CSI,0}$ and $C_{CSI,1}$ are configured with a higher layer in a UE, resource-restricted CSI measurements are configured in the UE. The resource-restricted CSI measurements are associated with a 'measSubframePattern' parameter for time domain measurement resource restriction.

In addition, the 'measSubframePattern' parameter is associated with an 'ABS pattern info' parameter that is transmitted between BSs. That is, the purpose of the resource-restricted CSI measurements is to allow the UE to discriminate (or identify) CSI values of an ABS subframe and a non-ABS subframe and to measure/report the same.

The present invention suggests that UL-DL configuration change be supported based on the periodicity (or period) of the ABS pattern or a multiple of the period in order to change UL-DL configurations without affecting resource-restricted CSI measurements.

That is, it is preferable that the period be set to 40 ms in FDD, 70 ms in the TDD UL-DL configuration 0, 20 ms in the TDD UL-DL configurations 1 to 5, and 60 ms in the TDD UL-DL configuration 6. It is also preferable that UL-DL configuration change be aligned with change of resource-restricted CSI measurements.

Fifth Embodiment

Specific system parameters and configurations may be reset based on a time point at which System Frame Number (SFN, $n_f$ in TS 36.211)=0.

For example, the ABS pattern described above is (reset and) repeated based on the time point of SFN=0.

The present invention suggests that UL-DL configuration change be set based on the time point of SFN=0 to simplify system configuration even though it may rather reduce the dynamic of UL-DL configuration change.

The minimum period of UL-DL configuration change may be set based on one or more period setting methods (or setting references or criteria) described above.

For example, when the (minimum) period of UL-DL configuration change is set taking into consideration the period setting methods of the first and second embodiments in FDD, the period is set to 8 ms or a multiple thereof according to the first embodiment and is set to 10 ms or a multiple thereof according to the second embodiment and therefore the period of UL-DL configuration change may be set to 40 ms which is a least common multiple of 8 ms and 10 ms (in the case in which change from FDD to TDD is supported).

Sixth Embodiment

In TDD, the (minimum) period of UL-DL configuration change may be set to a single value and may also vary depending on the UL-DL configuration.

That is, a different (minimum) change period may be set based on a UL-DL configuration currently established for each cell.

For example, the (minimum) period of UL-DL configuration change may be set to 70 ms in the TDD UL-DL configuration 0, 20 ms in the TDD UL-DL configurations 1 to 5, and 60 ms in the TDD UL-DL configuration 6. In another example, the (minimum) period of UL-DL configuration change may be set to 70 ms in the TDD UL-DL configuration 0 and 60 ms in the TDD UL-DL configurations 1 to 6.

Seventh Embodiment

In TDD, the (minimum) period of UL-DL configuration change may be set to a single value and may also vary depending on the UL-DL configuration.

That is, a single (minimum) change period may be set for each cell.

For example, the (minimum) period of UL-DL configuration change may be set to 420 ms (which is a least common multiple of 70 ms, 20 ms, and 60 ms), regardless of a currently set UL-DL configuration In another example, the (minimum) period of UL-DL configuration change may be set to an SFN period, regardless of the UL-DL configuration.

Eighth Embodiment

In the present invention, UL-DL configurations may be changed by RRC, MAC, or PHY signaling. Although it is preferable that UL-DL configuration change be signaled through a broadcast channel or message (e.g., primary broadcast channel (P-BCH), secondary broadcast channel (S-BCH), master information block (MIB), system information block (SIB)), UL-DL configuration change may also be signaled through a control channel (e.g., a PDCCH).

On the other hand, the (minimum) period of UL-DL configuration change needs to be applied based on a preset reference value. For example, the period may be set starting from the time point of SFN=0.

Application of the (minimum) period of UL-DL configuration change is associated with a time point at which UL-DL configuration change is actually applied when UL-DL configuration change has been instructed through such signaling. For example, when an instruction to change UL-DL configurations is received at a first subframe in a frame of SNF=0 in the UE in the case in which the (minimum) period is 60 ms, the UE does not change the UL-DL configuration immediately upon receiving the instruction but instead applies the changed UL-DL configuration to perform communication, starting from a frame that first comes in the UL-DL configuration after an interval of 60 ms from the beginning of the frame of SFN=0.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention have been described focusing mainly on the signal communication relationship between a terminal and a Base Station (BS). The communication relationship may be extended (or may be equally or similarly applied) to signal communication between a terminal and a relay or between a relay and a BS. Specific operations which have been described as being performed by the BS may also be performed by an upper node as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "terminal" may also be replaced with another term such as "user equipment (UE)", "mobile station (MS)", or "mobile subscriber station (MSS)".

The embodiments of the present invention can be implemented by hardware, firmware, software, or any combination thereof. In the case in which the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the methods and apparatuses for transmitting control information in a wireless communication system have been described with reference to examples in which the methods and apparatuses are applied to a 3GPP LTE system, the methods and apparatuses may also be applied to various wireless communication systems other than the 3GPP LTE system.

The invention claimed is:

1. A method for transmitting control information from a terminal to a base station in a wireless communication system, the method comprising:
receiving at least one of a Physical Downlink Control Channel (PDCCH) and a Physical Downlink Shared Channel (PDSCH) from the base station through at least one serving cell configured for the terminal; and
transmitting acknowledgement/negative acknowledgement (ACK/NACK) feedback associated with reception of the PDCCH or reception of a PDSCH related to the PDCCH to the base station,
wherein if the PDCCH indicates to set an uplink-downlink (UL-DL) configuration for the at least one serving cell to another UL-DL configuration, the terminal is configured to set the UL-DL configuration to the another UL-DL configuration at a timing pre-configured, and
wherein the indication of the PDCCH is transmitted at an interval pre-configured.

2. The method according to claim 1, wherein the interval is determined based on a Hybrid Automatic Repeat reQuest (HARQ) process period and a multiple of the HARQ process period.

3. The method according to claim 2, wherein the timing is repeated according to the HARQ process period or a multiple of the HARQ process period from a start or reset time of a System Frame Number (SFN).

4. The method according to claim 2, wherein the HARQ process period is 8 or more subframes.

5. The method according to claim 2, wherein the HARQ process period is determined differently according to the UL-DL configuration configured for the base station.

6. The method according to claim 5, wherein the HARQ process period is 70 ms when the base station has a 0th UL-DL configuration, 20 ms when the base station has 1st to 5th UL-DL configurations, and 60 ms when the base station has a 6th UL-DL configuration.

7. The method according to claim 1, wherein the interval is equal to a pattern period of an Almost Blank Subframe (ABS) or a multiple of the pattern period.

8. The method according to claim 7, wherein the timing is repeated according to the pattern period of the ABS or a multiple of the pattern period from a start or reset time of a System Frame Number (SFN).

9. The method according to claim 7, wherein the pattern period of the ABS is 70 ms when the base station has a 0th UL-DL configuration, 20 ms when the base station has 1st to 5th UL-DL configurations, and 60 ms when the base station has a 6th UL-DL configuration.

10. A terminal for transmitting control information to a base station in a wireless communication system, the terminal comprising:
a reception module for receiving at least one of a Physical Downlink Control Channel (PDCCH) and a Physical Downlink Shared Channel (PDSCH) from the base station through at least one serving cell configured for the terminal;
a transmission module for transmitting acknowledgement/negative acknowledgement (ACK/NACK) feedback associated with reception of the PDCCH or reception of a PDSCH related to the PDCCH to the base station; and
a processor for setting an uplink-downlink (UL-DL) configuration for the at least one serving cell to another UL-DL configuration at a timing pre-configured if the PDCCH indicates to set the UL-DL configuration to the another UL-DL configuration, and
wherein the indication of the PDCCH is transmitted at an interval pre-configured.

11. The terminal according to claim 10, wherein the interval is determined based on a Hybrid Automatic Repeat reQuest (HARQ) process period and a multiple of the HARQ process period.

12. The terminal according to claim 11, wherein the timing is repeated according to the HARQ process period or a multiple of the HARQ process period from a start or reset time of a System Frame Number (SFN).

13. The terminal according to claim 11, wherein the processor performs a control operation for determining the HARQ process period differently according to the UL-DL configuration configured for the base station.

14. The terminal according to claim 13, wherein the HARQ process period is 70 ms when the base station has a 0th UL-DL configuration, 20 ms when the base station has 1st to 5th UL-DL configurations, and 60 ms when the base station has a 6th UL-DL configuration.

15. The terminal according to claim 10, wherein the interval is equal to a pattern period of an Almost Blank Subframe (ABS) or a multiple of the pattern period.

16. The terminal according to claim 15, wherein the timing is repeated according to the pattern period of the ABS or a multiple of the pattern period from a start or reset time of a System Frame Number (SFN).

17. The terminal according to claim 15, wherein the pattern period of the ABS is 70 ms when the base station has a 0th UL-DL configuration, 20 ms when the base station has 1st to 5th UL-DL configurations, and 60 ms when the base station has a 6th UL-DL configuration.

* * * * *